United States Patent
Kamano et al.

(10) Patent No.: US 11,081,120 B2
(45) Date of Patent: Aug. 3, 2021

(54) ENCODED-SOUND DETERMINATION METHOD

(71) Applicant: FUJITSU LIMITED, Kawasaki (JP)

(72) Inventors: Akira Kamano, Kawasaki (JP);
Masanao Suzuki, Yokohama (JP);
Nobuyuki Washio, Akashi (JP); Yohei Kishi, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 101 days.

(21) Appl. No.: 16/361,534

(22) Filed: Mar. 22, 2019

(65) Prior Publication Data

US 2019/0318753 A1 Oct. 17, 2019

(30) Foreign Application Priority Data

Apr. 12, 2018 (JP) .............................. JP2018-076734

(51) Int. Cl.
*G10L 19/02* (2013.01)
*G06F 21/32* (2013.01)
*G06F 21/31* (2013.01)

(52) U.S. Cl.
CPC ............ *G10L 19/02* (2013.01); *G06F 21/316* (2013.01); *G06F 21/32* (2013.01)

(58) Field of Classification Search
None
See application file for complete search history.

(56) References Cited

U.S. PATENT DOCUMENTS

| | | | |
|---|---|---|---|
| 2007/0266154 A1 | 11/2007 | Ohta et al. | |
| 2011/0238426 A1 | 9/2011 | Fuchs et al. | |
| 2014/0350923 A1* | 11/2014 | Wu | G10L 25/84 |
| | | | 704/226 |
| 2015/0088509 A1* | 3/2015 | Gimenez | G10L 17/22 |
| | | | 704/243 |
| 2017/0200451 A1* | 7/2017 | Bocklet | G10L 17/02 |
| 2018/0293988 A1* | 10/2018 | Huang | G10L 17/20 |
| 2020/0043484 A1* | 2/2020 | Lesso | G10L 21/0208 |
| 2020/0043515 A1* | 2/2020 | Chae | G10L 25/51 |

FOREIGN PATENT DOCUMENTS

| | | |
|---|---|---|
| JP | 2007-264507 | 10/2007 |
| JP | 2010-237364 | 10/2010 |
| JP | 2013-123226 | 6/2013 |

* cited by examiner

*Primary Examiner* — Pierre Louis Desir
*Assistant Examiner* — Nicole A K Schmieder
(74) *Attorney, Agent, or Firm* — Fujitsu Patent Center

(57) ABSTRACT

A method for encoded-sound determination performed by a computer includes: executing a first process that includes obtaining information indicating intensities of sound signals, the frequencies being calculated from the sound signals and corresponding to frequencies; and executing a second process that includes determining whether or not the sound signals are signals of encoded sound, based on whether or not the intensities of the sound signals in predetermined frequency bands that are adjacent to each other in a frequency direction have a difference that is larger than or equal to a predetermined threshold.

17 Claims, 27 Drawing Sheets

ENCODED-SOUND DETERMINATION METHOD

CROSS-REFERENCE TO RELATED APPLICATION

This application is based upon and claims the benefit of priority of the prior Japanese Patent Application No. 2018-76734, filed on Apr. 12, 2018, the entire contents of which are incorporated herein by reference.

FIELD

The embodiments discussed herein are related to an encoded-sound determination program, an encoded-sound determination method, and an encoded-sound determination device.

BACKGROUND

In living space, voice services that can be operated with voice are increasing. However, various types of sound that exist in living space cause false recognition in voice recognition that underlines the voice services, thereby reducing user experience. This is because there is a possibility that a sound that exists in living space is falsely recognized as real voice of a user, and thus an unintended service is executed.

For example, in voice services that perform user authentication based on voice, when a recorded voice is played back with an intension of causing authentication with the recorded voice, instead of real voice of a user, an increase in the sound pressure of sound signals is detected between a period from a playback start time to a non-silence start time in a silence segment. This is because, in the silence segment, dark noise is superimposed from the playback start time of the recorded voice. In order to avoid authentication based on such recorded voice, there is a technology that determines that voice in question is recorded voice based on a sound-pressure increase in sound signals which is caused by superimposition of dark noise.

Examples of the related art include Japanese Laid-open Patent Publication No. 2007-264507.

SUMMARY

According to an aspect of the embodiments, a method for encoded-sound determination performed by a computer includes: executing a first process that includes obtaining information indicating intensities of sound signals, the frequencies being calculated from the sound signals and corresponding to frequencies; and executing a second process that includes determining whether or not the sound signals are signals of encoded sound, based on whether or not the intensities of the sound signals in predetermined frequency bands that are adjacent to each other in a frequency direction have a difference that is larger than or equal to a predetermined threshold.

The object and advantages of the invention will be realized and attained by means of the elements and combinations particularly pointed out in the claims.

It is to be understood that both the foregoing general description and the following detailed description are exemplary and explanatory and are not restrictive of the invention.

DESCRIPTION OF EMBODIMENTS

In living space, broadcast sound output from televisions and radios exists in many cases, and in the case of broadcast sound, sound is continuously played back, thus making it difficult to detect an increase in the sound pressure of sound signals which is caused by superimposition of dark noise, unlike recorded voice that is started to be played back for user authentication. Accordingly, in the technology described above, there is a problem in that it is difficult to distinguish between broadcast sound, that is, encoded sound, and real voice.

One aspect of the embodiment is aimed to improve the determination accuracy of encoded sound.

First Embodiment

An example of a first embodiment will be described in detail with reference to the accompanying drawings.

Figure 1A:
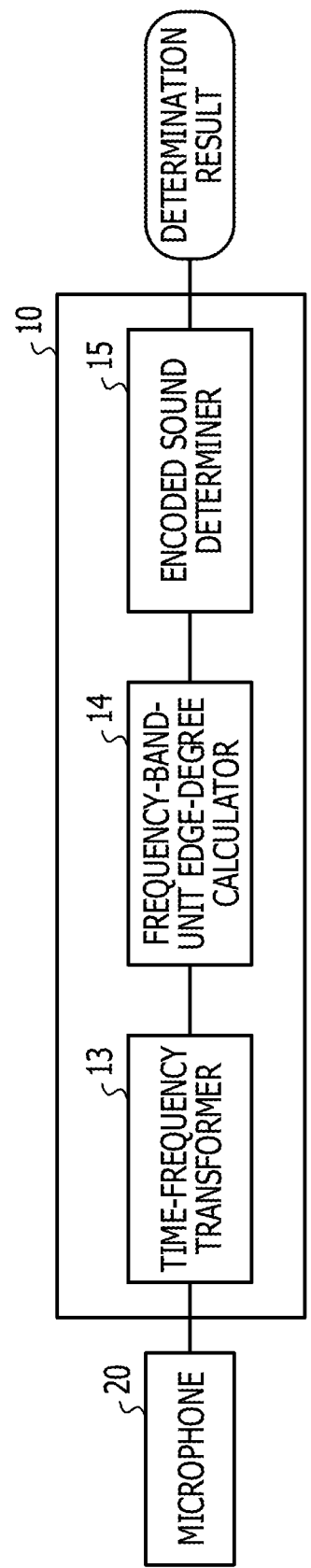
FIG. 1A illustrates functions of a major portion of an encoded-sound determination device.

FIG. 1A illustrates functions of a major portion of an encoded-sound determination device 10. The encoded-sound determination device 10 includes a time-frequency transformer 13, which is an example of an obtaining unit, a frequency-band-unit edge-degree calculator 14, which is an example of a determiner, and an encoded sound determiner 15.

The time-frequency transformer 13 is connected to a microphone 20 that converts obtained sound into sound signals, reads the power of the sound signals for a predetermined amount of time, performs a time-frequency transform on the power of the sound signals, and determines a relationship between a frequency of the sound signals and the power. The power of the sound signals is an example of an intensity of sound signals. The sound signals for the predetermined amount of time are, for example, sound signals for one frame. The intensity of sound signals may be, for example, the absolute value of a sound pressure of the sound signals.

For example, when the sampling frequency is 48 kHz, and the number of samples is 1024, one frame is about 21.3 ms. However, one frame may be, for example, 10 to 50 ms according to the sampling frequency, an encoding condition, and so on. Performing the time-frequency transform on sound signals in a plurality of frames makes it possible to determine a relationship among the time, the frequency, and the power.

Figure 2:
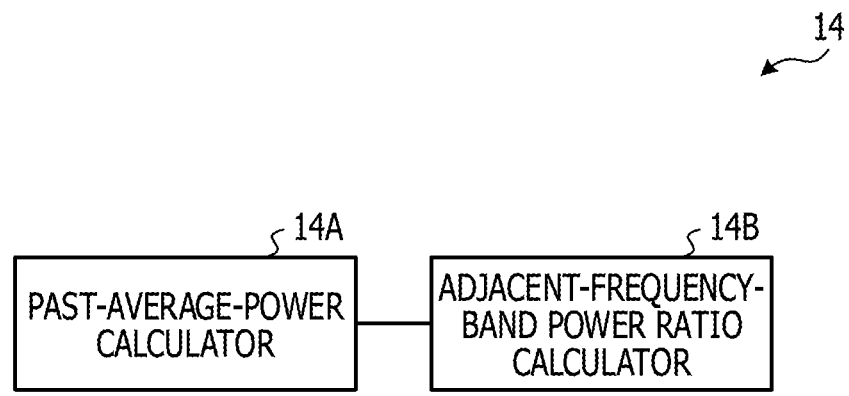
FIG. 2 illustrates functions of a major portion of a frequency-band-unit edge-degree calculator.

As illustrated in FIG. 2, the frequency-band-unit edge-degree calculator 14 includes a past-average-power calculator 14A and an adjacent-frequency-band power ratio calculator 14B. The past-average-power calculator 14A calculates, for each frequency sample, the average value of the powers of sound signals for a predetermined number of past frames from the current frame. For example, the past-average-power calculator 14A calculates a power $P_{t,k}$ of sound signals for each frame and for each frequency sample. In this case, t represents a frame number, and k represents a frequency sample number.

The past-average-power calculator 14A uses equation (1) below to calculate the average value of powers $P_{t,k}$ for the past M frames. M represents a predetermined number of frames. The average value of the powers $P_{t,k}$ for the past M frames is an example of a time-direction average value.

$$\overline{P_k} = \frac{1}{M} \sum_{i=0}^{M-1} P_{t-i,k} \tag{1}$$

The predetermined number of frames, M is, for example, five frames. However, for example, the predetermined number of frames, M, may be one frame, two to four frames, or six frames in accordance with the response time.

The adjacent-frequency-band power ratio calculator 14B calculates the average value of powers for each predetermined frequency-band unit, based on the average values of powers calculated for respective frequency samples ad calculates, as an edge degree, the logarithm of ratio between the average values of the powers in the adjacent predetermined frequency-band units. Each of the predetermined frequency-band units is an example of a predetermined frequency band. The "edge" as used herein is a portion where the intensity of sound signals changes suddenly in the frequency direction, and the "edge degree" refers to a degree to which the intensity of sound signals changes in the frequency direction. The edge degree is an example of a value indicating a difference between averages of intensities of predetermined frequency-band units that are adjacent in the frequency direction.

The adjacent-frequency-band power ratio calculator 14B calculates the average value of powers for each predetermined frequency-band unit by adding, for each predetermined number Fc of frequency samples, the average values of the powers of the sound signals which are calculated using equation (1) and dividing the resulting value by the predetermined number Fc, as in equation (2):

$$PS_n = \frac{1}{Fc} \sum_{j=Fc*n}^{Fc*(n+1)} \overline{P_j} \tag{2}$$

where n is a number indicating each of the predetermined frequency-band units and is an integer greater than or equal to 0.

The adjacent-frequency-band power ratio calculator 14B calculates an edge degree $E_n$, which is a difference between the average values of the powers of sound signals in adjacent predetermined frequency-band units, by using equation (3):

$$E_n = \log_{10}\left(\frac{PS_n}{PS_{n+1}}\right). \tag{3}$$

In equation (3) the edge degree $E_n$ has a value that is closer to 0, as the difference between the average values of the powers of the sound signals in the adjacent predetermined frequency-band units decreases. However, for example, the edge degree $E_n$ may be calculated using:

$$E_n = \log_{10}\left(\frac{PS_{n+1}}{PS_n}\right) \tag{4}$$

The edge degree is represented by the logarithm of a ratio between the average values of the powers of sound signals in adjacent predetermined frequency-band units. The edge degree may be represented by a value obtained by subtracting the logarithm of the average value of the powers of sound signals from the logarithm of the average value of the powers of sound signals.

The encoded sound determiner 15 determines whether or not the sound signals are signals of encoded sound, based on the edge degree calculated by the frequency-band-unit edge-degree calculator 14 and outputs a determination result. The determination result is input to, for example, voice-operated device that is operated by voice. Examples of the voice-operated device include a smart speaker.

Figure 1B:
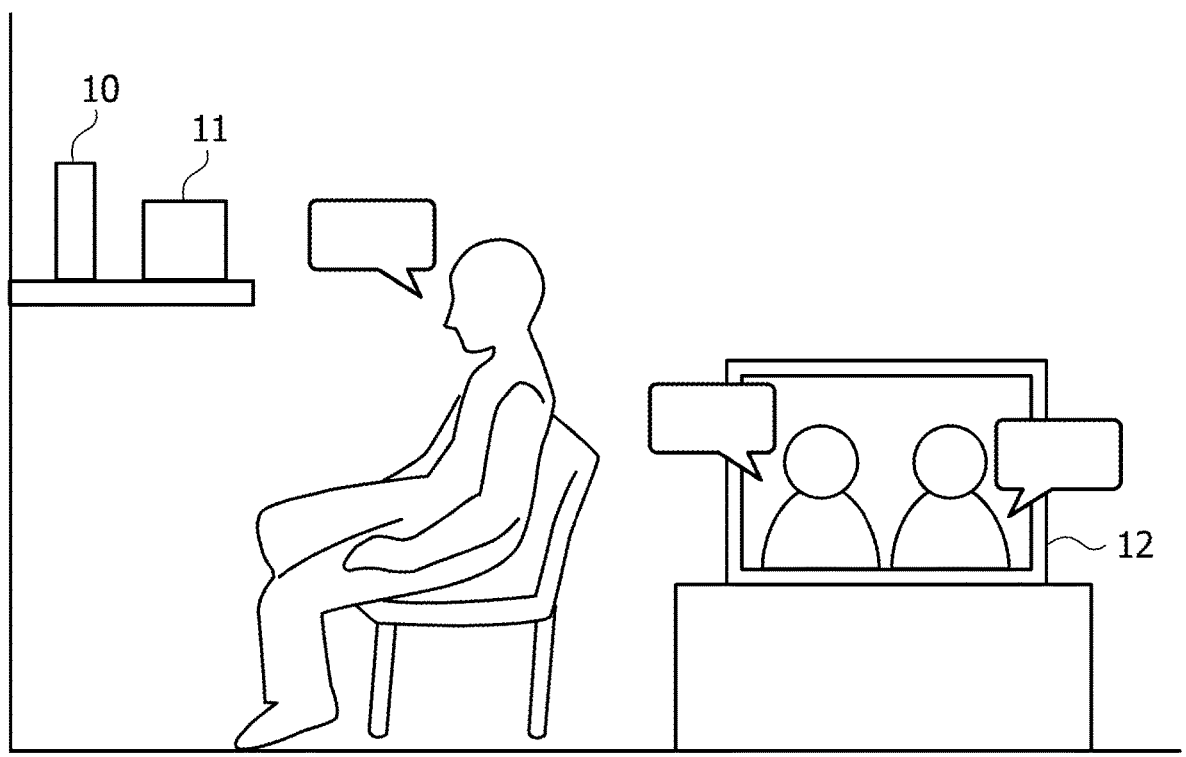
FIG. 1B illustrates an environment including the encoded-sound determination device.

FIG. 1B illustrates an environment including the encoded-sound determination device 10. The encoded-sound determination device 10 is used, for example, in an environment where an appliance, such as a television 12, that outputs broadcast sound, for example, encoded sound, is provided, and a user speaks to a voice-operated device, such as a smart speaker 11. The encoded-sound determination device 10 and the smart speaker 11 are connected to each other in a wired or wireless manner, and a determination result output from the encoded-sound determination device 10 is input to the smart speaker 11 through the connection.

Figure 3:
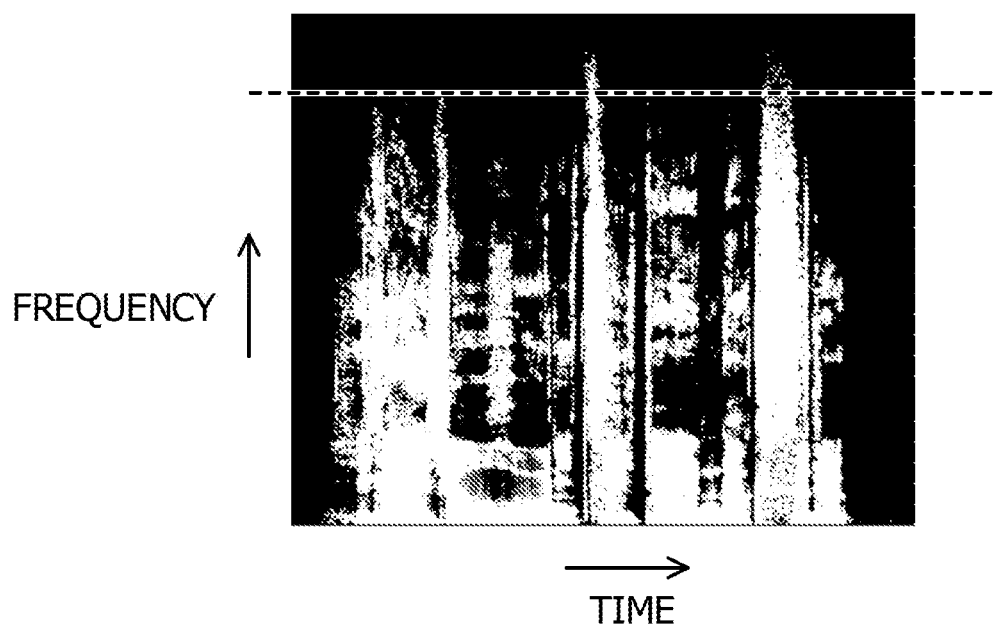
FIG. 3 illustrates power spectra of real voice.
Figure 4:
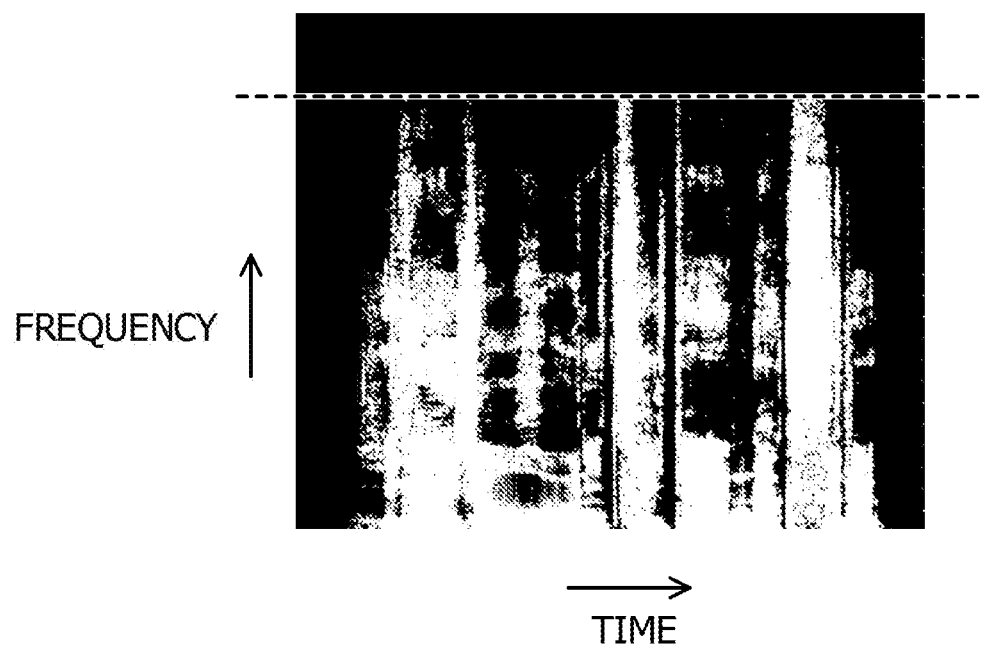
FIG. 4 illustrates power spectra of encoded sound.

FIG. 3 illustrates power spectra of sound signals of real voice, and FIG. 4 illustrates a power spectra of sound signals of encoded sound. In FIGS. 3 and 4, the vertical axis represents a frequency, and the horizontal axis represents time. The larger the power is, the brighter color close to white it is represented, and the smaller the power is, the darker color close to black it is represented.

In encoding of sound signals, sound signals in a band higher than or equal to a boundary frequency are suppressed or reduced in order to reduce the amount of information to an amount within a predetermined bit rate. Thus, in the encoded sound illustrated in FIG. 4, sound signals do not exist in a band higher than a dashed line indicating the boundary frequency. On the other hand, in the real voice illustrated in FIG. 3, there is no boundary frequency above which sound signals do not exist.

Figure 5:
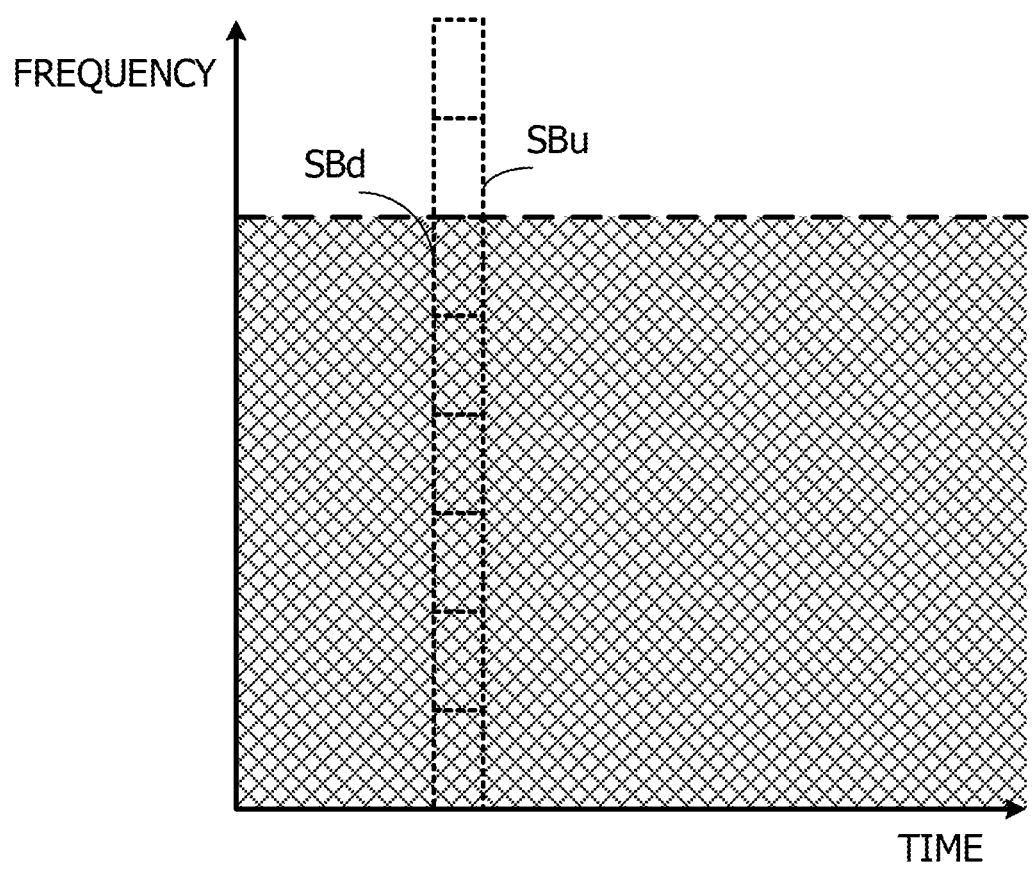
FIG. 5 illustrates a relationship between the power spectra of encoded sound and predetermined frequency-band units.

FIG. 5 illustrates a relationship between the power spectra of encoded sound and the predetermined frequency-band units. In the encoded sound, a difference between the average value of the powers of sound signals in a predetermined frequency-band unit $SB_d$ that is below the dashed line representing the boundary frequency and the average value of the powers of the sound signals in a predetermined frequency-band unit $SB_u$ that is above the dashed line is smaller than a difference between the average values of the powers of the sound signals in other adjacent predetermined frequency-band units.

For example, when one of the edge degrees $E_n$ calculated using equation (3) exceeds a threshold, which is an example of a first predetermined value, the encoded sound determiner 15 determines that the sound signals are signals of encoded sound.

Equations (3) are (4) are exemplary, and the edge degree may be represented by a ratio between the average values of powers in adjacent predetermined frequency-band units, not the logarithm of the ratio between the average values of powers in adjacent predetermined frequency-band units. The degree may be represented by a difference between the average values of the powers of sound signals in adjacent predetermined frequency-band units, instead of the ratio between the average values of powers in adjacent predetermined frequency-band units. With respect to the threshold for determining whether or not the sound signals are signals of encoded sound, an appropriate value is set in accordance with an equation for calculating a difference between the average values of the powers of sound signals in adjacent predetermined frequency-band units.

Figure 6:
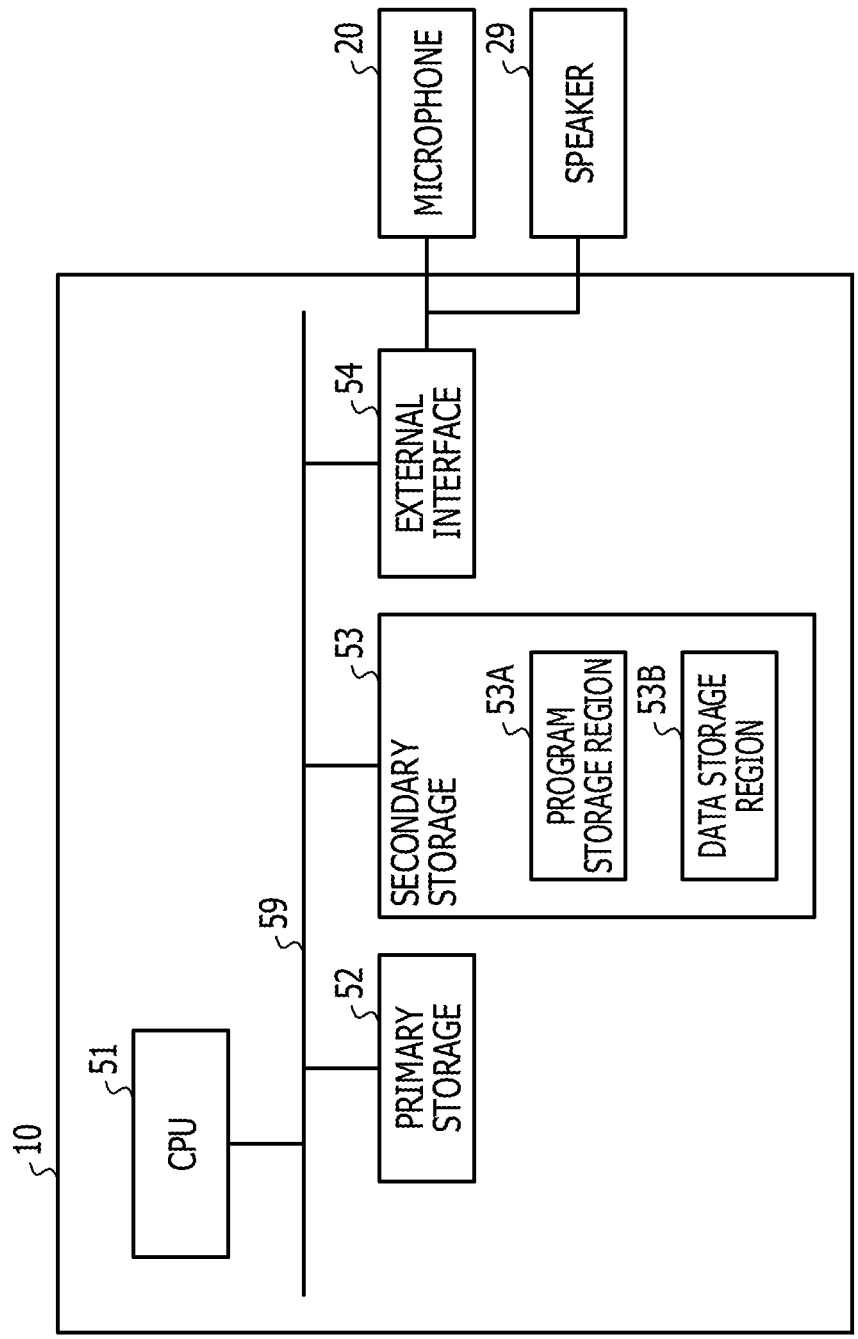
FIG. 6 illustrates a hardware configuration of the encoded-sound determination device.

FIG. 6 illustrates a hardware configuration of the encoded-sound determination device 10. The encoded-sound determination device 10 includes a central processing unit (CPU) 51, a primary storage 52, a secondary storage 53, and an external interface 54. The CPU 51 is an example of a processor which is hardware.

The CPU 51, the primary storage 52, the secondary storage 53, and the external interface 54 are connected to each other through a bus 59.

The primary storage 52 is, for example, a volatile memory, such as a random-access memory (RAM). The secondary storage 53 is, for example, a nonvolatile memory, such as a hard disk drive (HDD) or a solid-state drive (SSD).

The secondary storage 53 includes a program storage region 53A and a data storage region 53B. The program storage region 53A stores therein programs, such as an encoded-sound determination program for causing the CPU 51 to execute encoded-sound determination processing, by way of example. The data storage region 53B stores therein sound signals corresponding to sound obtained by the microphone 20, intermediate data that is temporarily generated in the encoded-sound determination processing, and so on.

The CPU 51 reads the encoded-sound determination program from the program storage region 53A and loads the encoded-sound determination program into the primary storage 52. By executing the encoded-sound determination program, the CPU 51 operates as the time-frequency transformer 13, the frequency-band-unit edge-degree calculator 14, and the encoded sound determiner 15 illustrated in FIG. 1. Programs, such as the encoded-sound determination program, may be stored in a non-transitory recording medium, such as a digital versatile disc (DVD), or may be read via a recording-medium reading device and be loaded into the primary storage 52.

An external device is connected to the external interface 54. The external interface 54 is responsible for transmission/reception of various types of information between the external device and the CPU 51. For example, the encoded-sound determination device 10 is connected to the microphone 20, which obtains sound, via the external interface 54. The microphone 20, however, may be built into the encoded-sound determination device 10.

For example, the encoded-sound determination device 10 is connected to a speaker 29, which generates sound, via the external interface 54. The speaker 29 may generate, for example, voice or alarm sound to give a notification indicating the determination result, for example, a notification indicating whether or not voice in question is encoded sound. The speaker 29 may be the smart speaker 11, which is an example of a voice-operated device, and based on the determination result indicating whether or not voice in question is encoded sound, the smart speaker 11 may determine whether or not a voice operation is to be performed. The speaker 29 may be built into the encoded-sound determination device 10.

Figure 7:
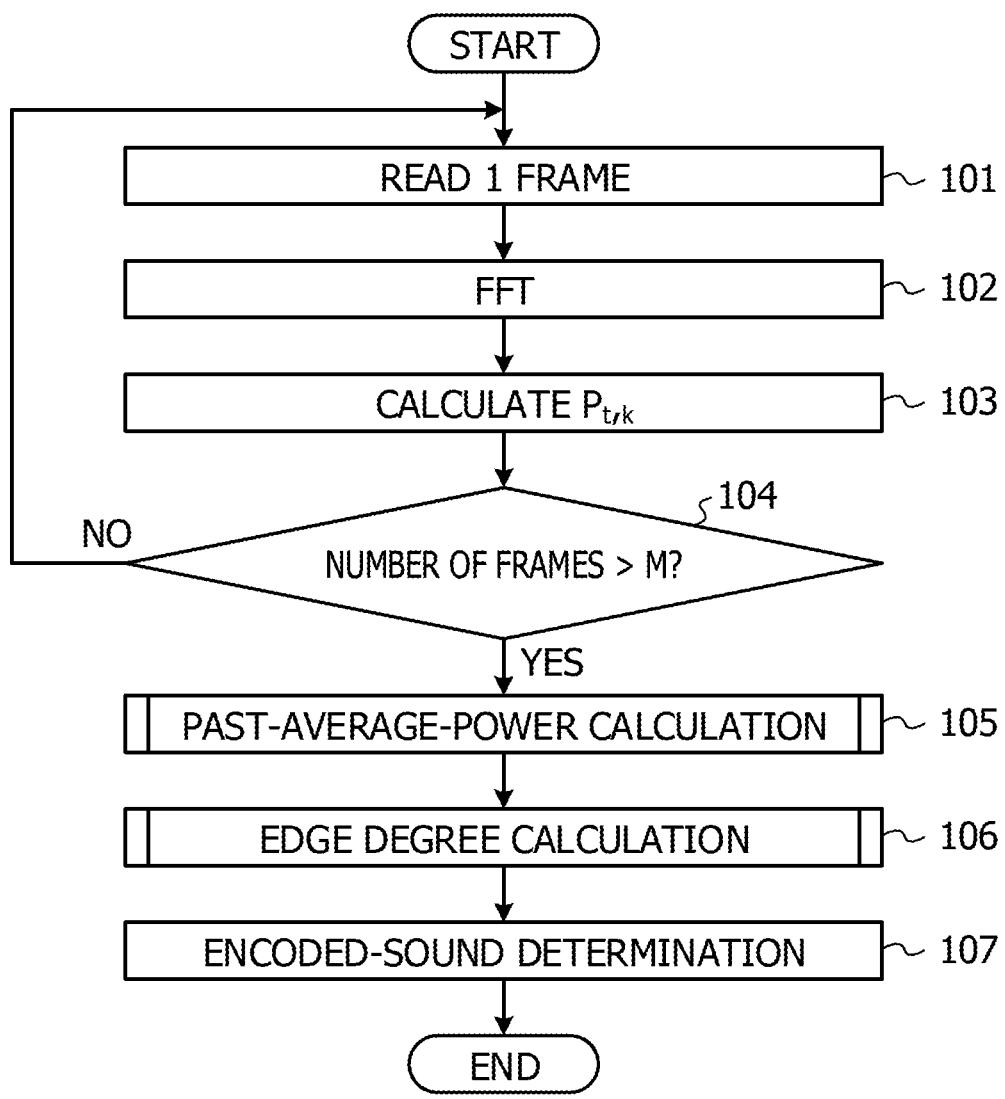
FIG. 7 is a flowchart illustrating a flow of encoded-sound determination processing in the first and second embodiments.

Next, a description will be given of operations of the encoded-sound determination device 10. FIG. 7 is a flow-chart illustrating a flow of the encoded-sound determination processing performed by the encoded-sound determination device 10. In step 101, the CPU 51 reads sound signals corresponding to one frame. In step 102, the CPU 51 performs a time-frequency transform on the sound signals. Time-frequency transform may be, for example, a fast Fourier transform (FFT).

In step 103, the CPU 51 calculates a power $P_{t,k}$ of the sound signals for each frequency sample number k of the sound signals with a frame number t. The frame number of a current frame is set for the frame number t, and the frequency sample number k starts from 0 and is increased by 1 for each number. In step 104, the CPU 51 determines whether or not the number of frames read in step 101 exceeds a predetermined number of frames, M. When the result of the determination in step 104 is negative, that is, when the number of frames does not exceed the predetermined number of frames, M, the CPU 51 returns to step 101.

When the result of the determination in step 104 is affirmative, that is, when the number of frames exceeds the predetermined number of frames, M, the CPU 51 calculates an average value of powers for the past M frames in step 105 and calculates an edge degree in step 106. Steps 105 and 106 are described later. In step 107, the CPU 51 determines whether or not the sound signals are signals of encoded sound, based on the calculated edge degree. The encoded-sound determination processing in FIG. 7 may be repeated a predetermined number of times.

Figure 8:
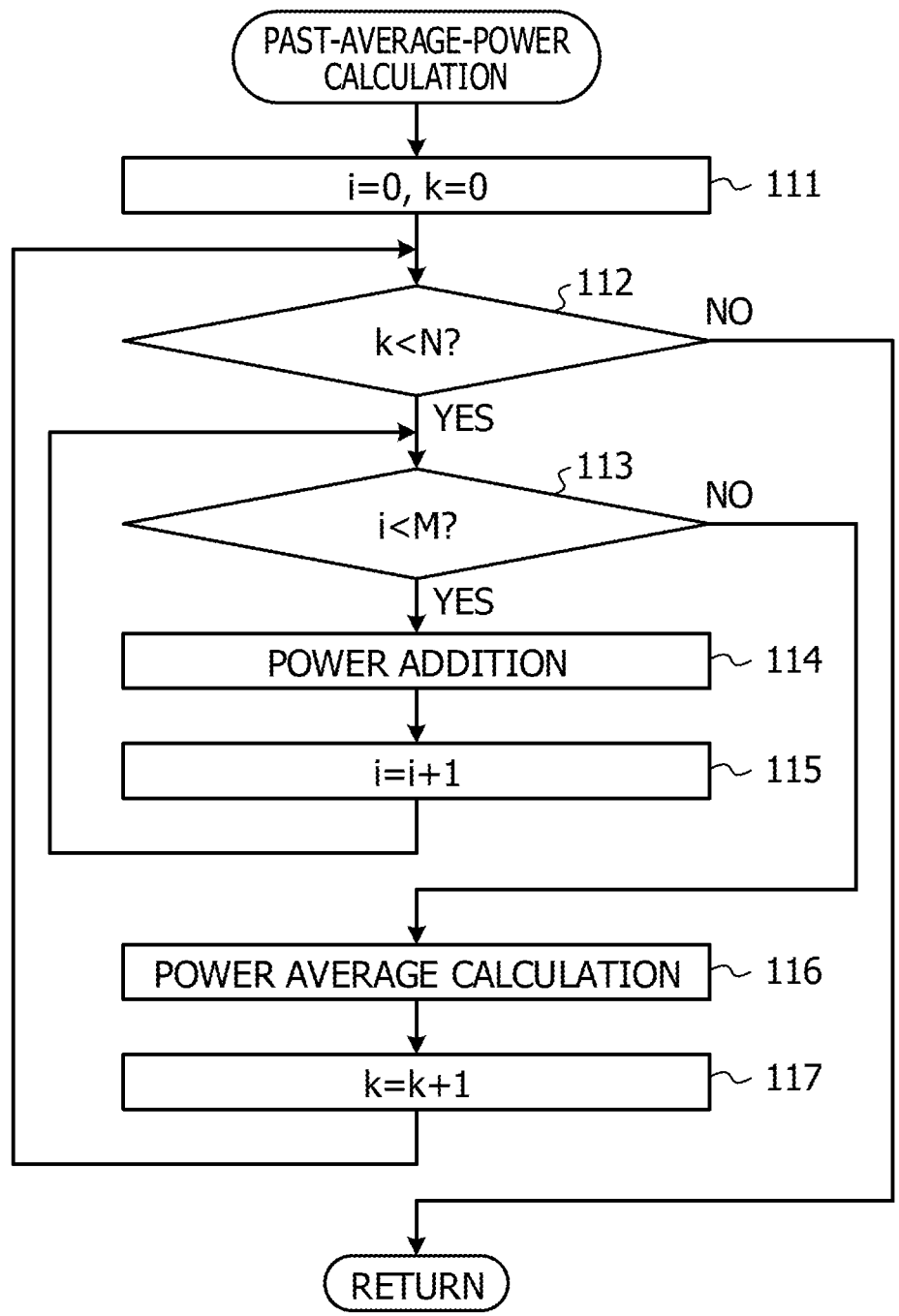
FIG. 8 is a flowchart illustrating a flow of past-average-power calculation processing.

FIG. 8 is a flowchart illustrating a flow of the past-average-power calculation processing in step 105 in FIG. 7. In step 111, the CPU 51 sets 0 for a variable i indicating a frame position from the frame number t of the current frame and sets 0 for a variable k indicating the frequency sample number. In step 112, the CPU 51 determines whether or not the value of the variable k is smaller than the number of frequency samples, N. The number of frequency samples, N, is 512, when the sampling frequency is 48 kHz, and one frame includes 1024 samples (about 21.3 ms).

When the result of the determination in step 112 is negative, that is, when the value of the variable k is larger than or equal to N, the CPU 51 ends the past-average-power calculation processing. When the result of the determination in step 112 is affirmative, that is, when the value of the variable k is smaller than N, the process proceeds to step 113 in which the CPU 51 determines whether or not the value of the variable i is smaller than the predetermined number of frames, M.

When the result of the determination in step 113 is affirmative, that is, when the value of the variable i is smaller than the predetermined number of frames, M, the process proceeds to step 114 in which the CPU 51 performs addition so that the powers whose frequency sample number is k for the $t-i^{th}$ frame are cumulated. In step 115, the CPU 51 adds 1 to the value of the variable i and then returns to step 113. In steps 113 to 115, the powers of sound signals whose frequency sample number is k are accumulated for M frames.

When the result of the determination in step 113 is negative, the process proceeds to step 116 in which the CPU 51 calculates the average value of the powers for each frequency sample by dividing the power that is accumulated for the M frames and whose frequency sample number is k by the predetermined number of frames, M, as illustrated in equation (1). A case in which the result of the determination in step 113 is negative corresponds to a case in which the value of the variable i is larger than or equal to M. In step 117, the CPU 51 adds 1 to the value of the variable k and then returns to step 112.

Figure 9:
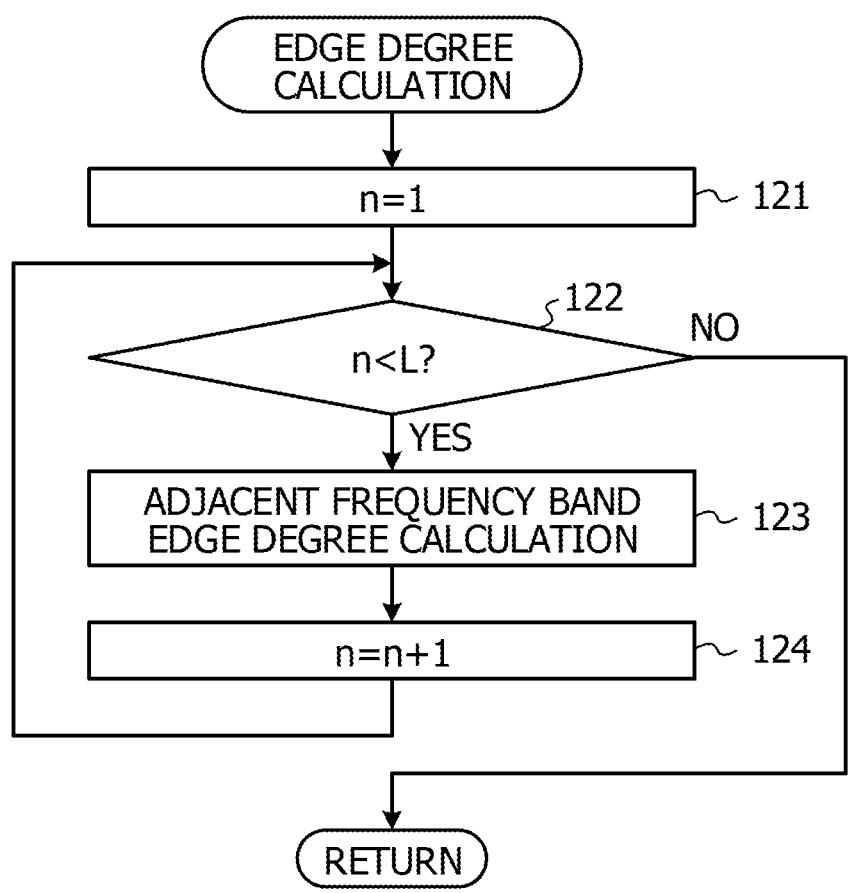
FIG. 9 is a flowchart illustrating a flow of edge-degree calculation processing.

FIG. 9 is a flowchart illustrating a flow of the edge-degree calculation processing in step 106 in FIG. 7. In step 121, the CPU 51 sets 1 for a variable n representing the number of a predetermined frequency-band unit. In step 122, the CPU 51 determines whether or not the value of the variable n is smaller than L. L is a value representing the total number of predetermined frequency-band units. When the result of the determination is step 122 is negative, that is, when the value of the variable n is larger than or equal to L, the CPU 51 ends the edge-degree calculation processing.

When the result of the determination in step 122 is affirmative, that is, when the value of the variable n is smaller than L, the process proceeds to step 123 in which the CPU 51 calculates an edge degree of the adjacent predetermined frequency-band units. For example, the average values of powers in the $n^{th}$ and $n+1^{st}$ predetermined frequency-band units are calculated as in equation (2), and the logarithm of the ratio between the average values of powers in the $n^{th}$ and $n+1^{st}$ frequency bands is calculated as in equation (3). In step 124, the CPU 51 adds 1 to the value of the variable n and returns to step 122.

Figure 10:
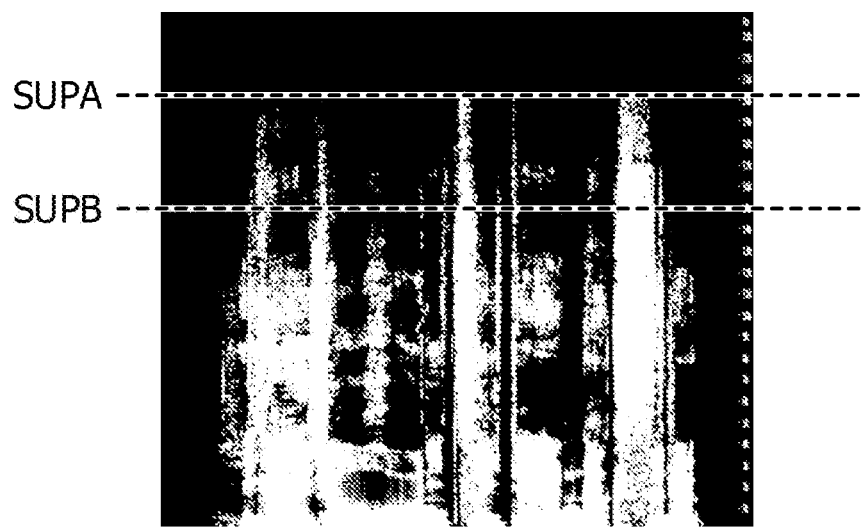
FIG. 10 illustrates power spectra of encoded sound.
Figure 11:
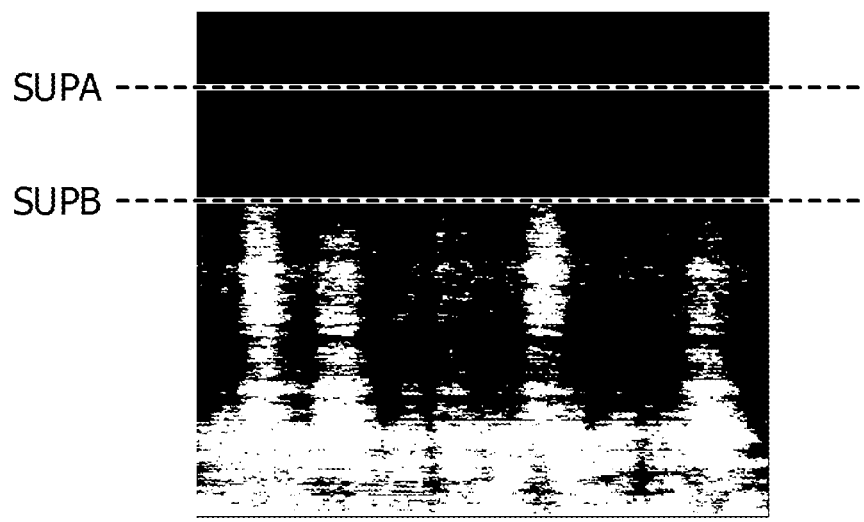
FIG. 11 illustrates power spectra of encoded sound.

Although the power of sound signals in frequencies that are higher than or equal to the boundary frequency is reduced for the encoded sound, the boundary frequency varies depending on the type of encoding during encoding of sound signals, for example, the type of encoder used, or an encoding condition. FIGS. 10 and 11 illustrate power spectra of sound signals encoded using different encoders. In sound signals in FIG. 10 which are encoded using an encoder A, a dashed line SUPA represents a boundary frequency, and in sound signals in FIG. 11 which are encoded using an encoder B, a dashed line SUPB represents a boundary frequency.

Figure 12:
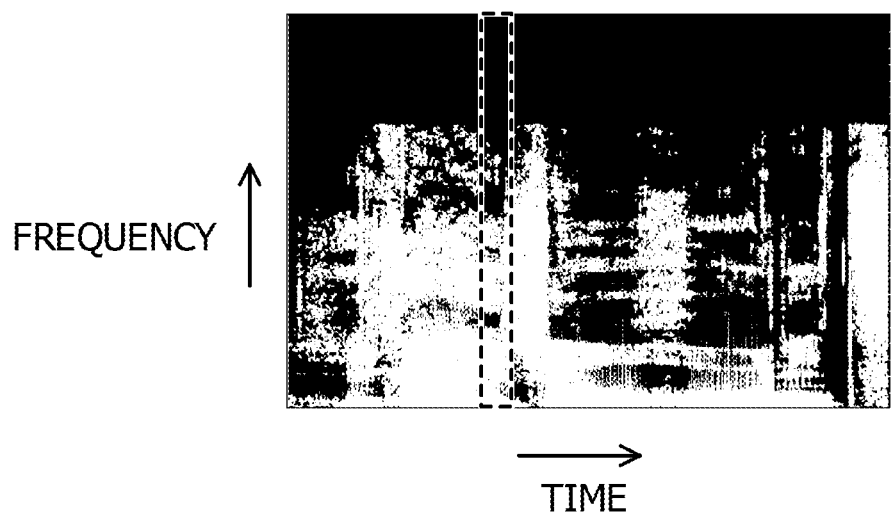
FIG. 12 illustrates power spectra of encoded sound.
Figure 13:
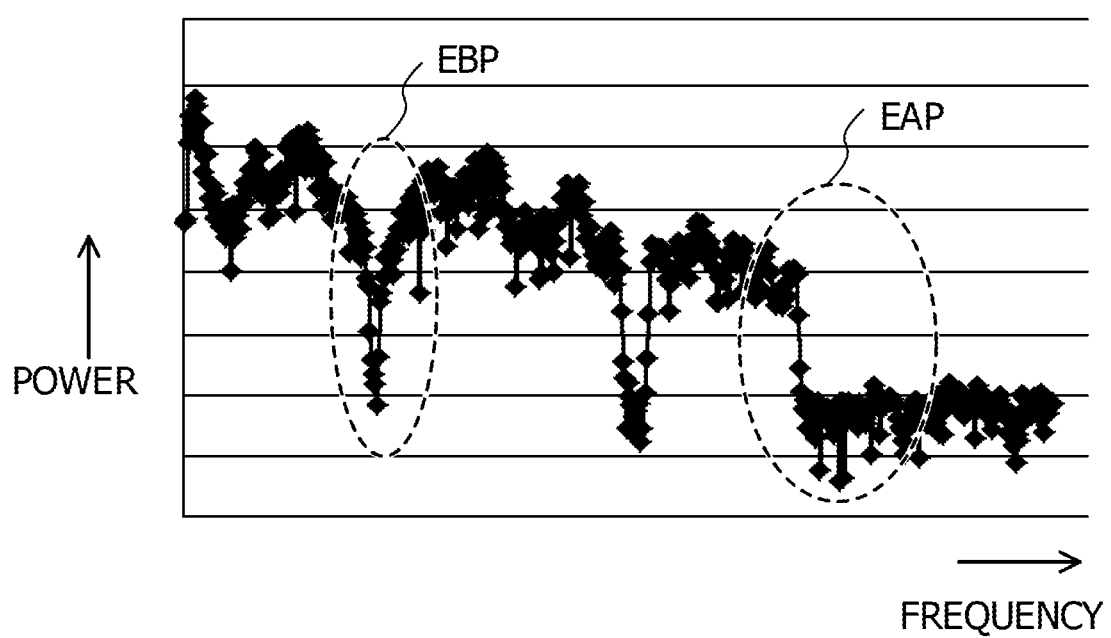
FIG. 13 illustrates power spectra of encoded sound.

Even when the edge degree is determined using adjacent single-frequency samples, rather than using predetermined frequency-band units including a plurality of frequency samples, as in the first embodiment, an edge degree that exceeds the threshold appears at the boundary frequency, as long as the sound signals in question are signals of encoded sound. FIG. 13 illustrates a relationship between frequencies and the powers of sound signals in one frame which are denoted by dashed-line ovals on encoded sound whose power spectra are illustrated in FIG. 12. The vertical axis in FIG. 13 represents a power, and the horizontal axis represents a frequency.

Figure 14:
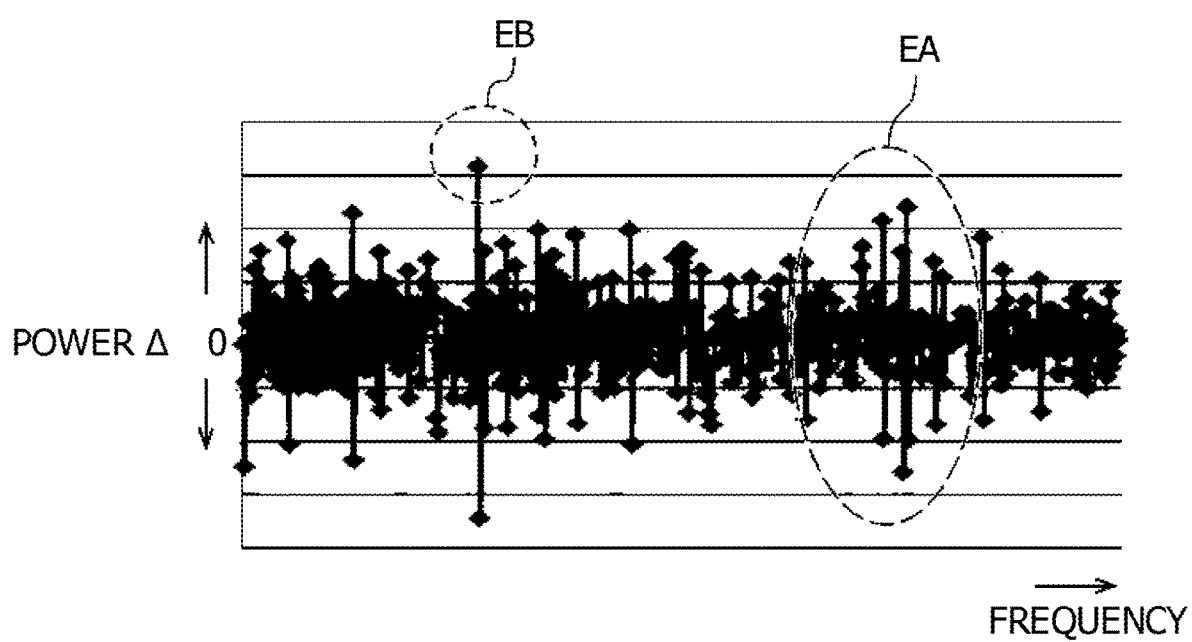
FIG. 14 illustrates power $\Delta$ of frequency samples of encoded sound.

FIG. 14 illustrates a relationship between frequencies and a power Δ that is a difference between the powers of adjacent single-frequency samples in FIG. 13. In FIG. 14, the vertical axis represents a power Δ, and the horizontal axis represents a frequency. As illustrated in FIG. 14, a power Δ EB is larger than a power Δ EA. The power Δ EB corresponds to power EBP in FIG. 13, and the power Δ EA corresponds to a power EAP in FIG. 13.

As is apparent from powers in the frequencies before and after the powers EBP and EAP in FIG. 13, a power Δ corresponding to the boundary frequency is EA, and the power Δ EB is not a power Δ corresponding to a boundary frequency. When the edge degree is determined for adjacent single-frequency samples, detection of a false boundary frequency may cause an erroneous determination.

Figure 15:
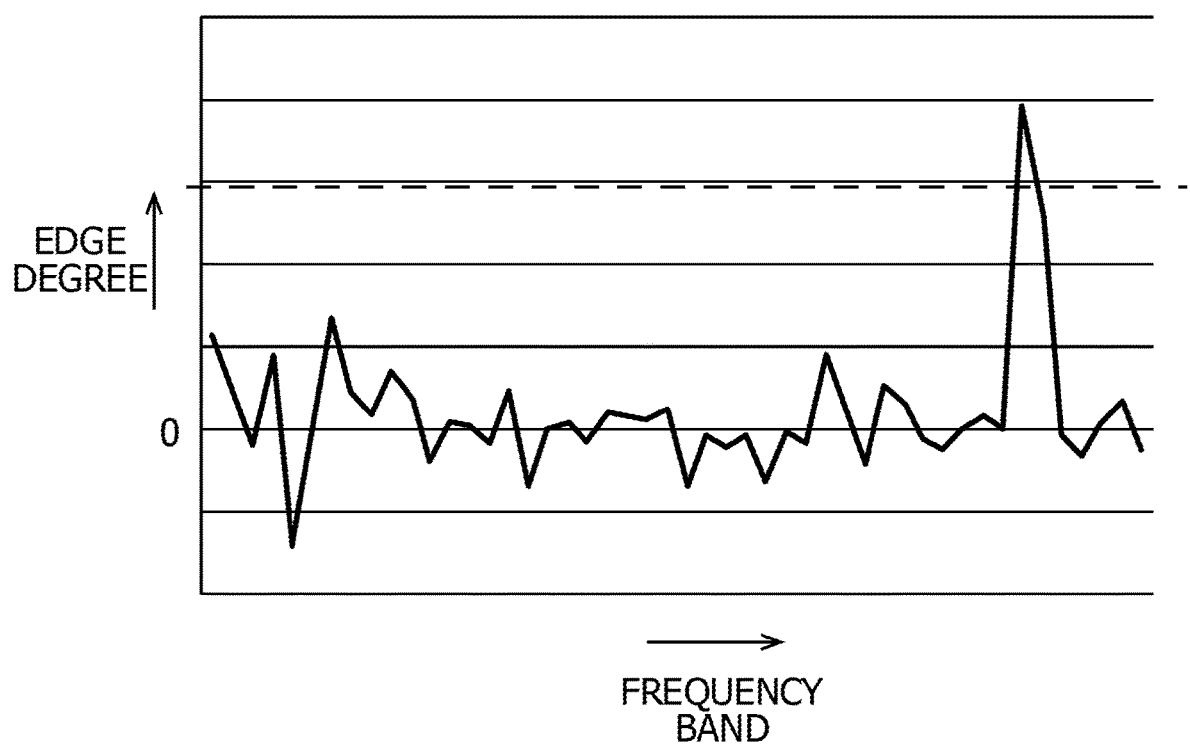
FIG. 15 illustrates an edge degree of adjacent predetermined frequency-band units of encoded sound.

In the first embodiment, a value indicating a difference between the average values of powers in adjacent predetermined frequency-band units is calculated as an edge degree. FIG. 15 illustrates a relationship between the edge degree and the predetermined frequency-band units. In FIG. 15, the vertical axis represents an edge degree, and the horizontal axis represents the numbers of the predetermined frequency-band units. In FIG. 15, only the edge degree of the predetermined frequency-band units that are adjacent to each other in the vicinity of the boundary frequency exceeds a threshold indicated by the dashed line.

As illustrated in FIG. 13, in the vicinity of the false boundary frequency, the power decreases instantaneously and then returns to its original power soon. The value indicating a difference between the average values of powers in the predetermined frequency-band units that are adjacent in the frequency direction is used as an edge degree to thereby smooth changes in the power in the frequency direction, thus suppressing an edge degree in the vicinity of the false boundary frequency. Accordingly, the edge degree of the adjacent predetermined frequency-band units in the vicinity of the false boundary frequency does not exceed the threshold. This makes it possible to reduce the possibility of an erroneous determination in which it is determined that the false boundary frequency is a boundary frequency.

In the first embodiment, information indicating intensities of sound-signals, the intensities being calculated from the sound signals and corresponding to frequencies, is obtained, and a process for determining whether or not the sound signals are signals of encoded sound is performed based on the presence/absence of a difference between the sound-signal intensities of the predetermined frequency bands that are adjacent to each other in the frequency direction, the difference being is larger than or equal to a predetermined threshold.

In the encoded sound, since sound signals that are higher than the boundary frequency are suppressed, the average values of the intensities of sound signals in predetermined frequency-band units that are adjacent to each other above and below the boundary frequency are larger than the average values of the intensities of sound signals in other adjacent predetermined frequency-band units. This makes it possible to determine, in the first embodiment, whether or not sound signals in question are signals of encoded sound even when the encoded sound is sound that is continuously played, such as broadcast sound, thus making it possible to enhance the accuracy of the encoded-sound determination.

In the first embodiment, the encoded sound can be determined in a short period of time, for example, with sound signals in a period of 1 s or less.

Second Embodiment

An example of a second embodiment will be described in detail with reference to the accompanying drawings. Configurations and operations that are the same as or similar to those in the first embodiment are denoted by the same reference numerals, and descriptions thereof are not given hereinafter.

The second embodiment differs from the first embodiment in that the predetermined frequency-band units illustrated in FIG. 5 are defined so as to correspond to respective scale factor bands (SFB). The SFBs are sub-bands whose width and boundary position are determined according to a relationship between quantized error and hearing characteristics and are defined by encoding standards for broadcast sound of televisions, radios, and so on.

Figure 16:
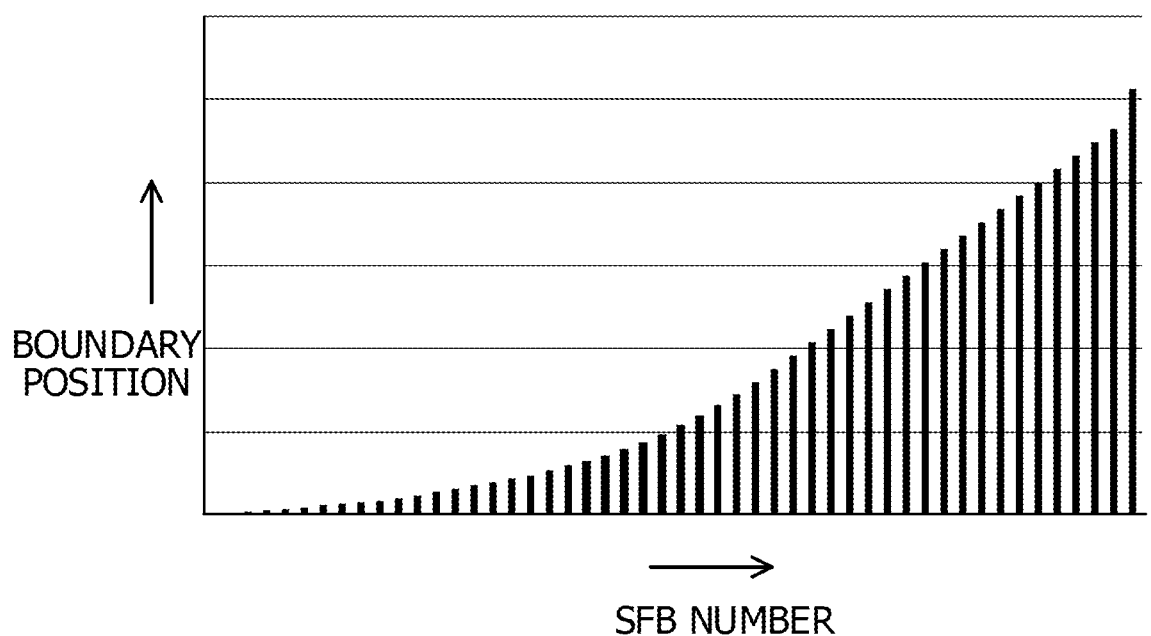
FIG. 16 illustrates boundary positions of respective scale factor bands.

FIG. 16 is a graph illustrating relationships between boundary positions SI of SFBs and SFB numbers I. The vertical axis represents the boundary positions SI of the SFBs represented by the sample numbers of frequencies, and the horizontal axis represents the SFB numbers I. SI and I are integers greater than or equal to 0. Broadcast sound is encoded by Advanced Audio Coding-Low Complexity (AAC-LC), and the SFBs are defined by the standard International Organization for Standardization (ISO)/International Electrotechnical Commission (IEC) 13818-7. For example, when the encoding is AAC-LC encoding, and the sampling frequency is 48 kHz, the number of SFBs is 49.

In the second embodiment, the average values of the powers of sound signals which are calculated using equation (1) are added for each SFB, and the resulting average value is divided by the number of frequency samples included in the SFB to thereby calculate the average value of the powers for each SFB, as illustrated in equation (5). An edge degree $ET_I$, which is a difference between the average values of the powers of the sound signals in adjacent SFBs, is calculated as in equation (6).

$$PT_I = \frac{1}{S_{I+1} - S_I} \sum_{j=S_I}^{S_{I+1}} \overline{P_j} \quad (5)$$

$$ET_I = \log_{10}\left(\frac{PT_I}{PT_{I+1}}\right) \quad (6)$$

In the encoding of broadcast sound, since band limitation is performed at the boundary position of SFBs, a boundary frequency exists at the boundary position of the adjacent SFBs. Accordingly, when the predetermined frequency-band units are defined so as to correspond to the respective SFBs, an edge degree that is a difference between the powers in frequency bands units that are adjacent to each other above and below the boundary frequency is increased, and an edge degree that is a difference between the powers in frequency bands units that are adjacent to each other at a position other than the boundary frequency is reduced. Thus, in the second embodiment, the possibility that a false boundary frequency is erroneously determined to be a boundary frequency is reduced, thus making it possible to further improve the determination accuracy of encoded sound.

Third Embodiment

An example of a third embodiment will be described in detail with reference to the accompanying drawings. Elements and operations that are the same as or similar to those in the first or second embodiment are denoted by the same reference numerals, and descriptions thereof are not given hereinafter.

A third embodiment differs from the first or second embodiment in that when an edge degree that exceeds a threshold continues at the same frequency band boundary for a long period of time, it is determined that the sound signals in question are signals of encoded sound. The long period of time is, for example, 0.5 s.

Figure 17:
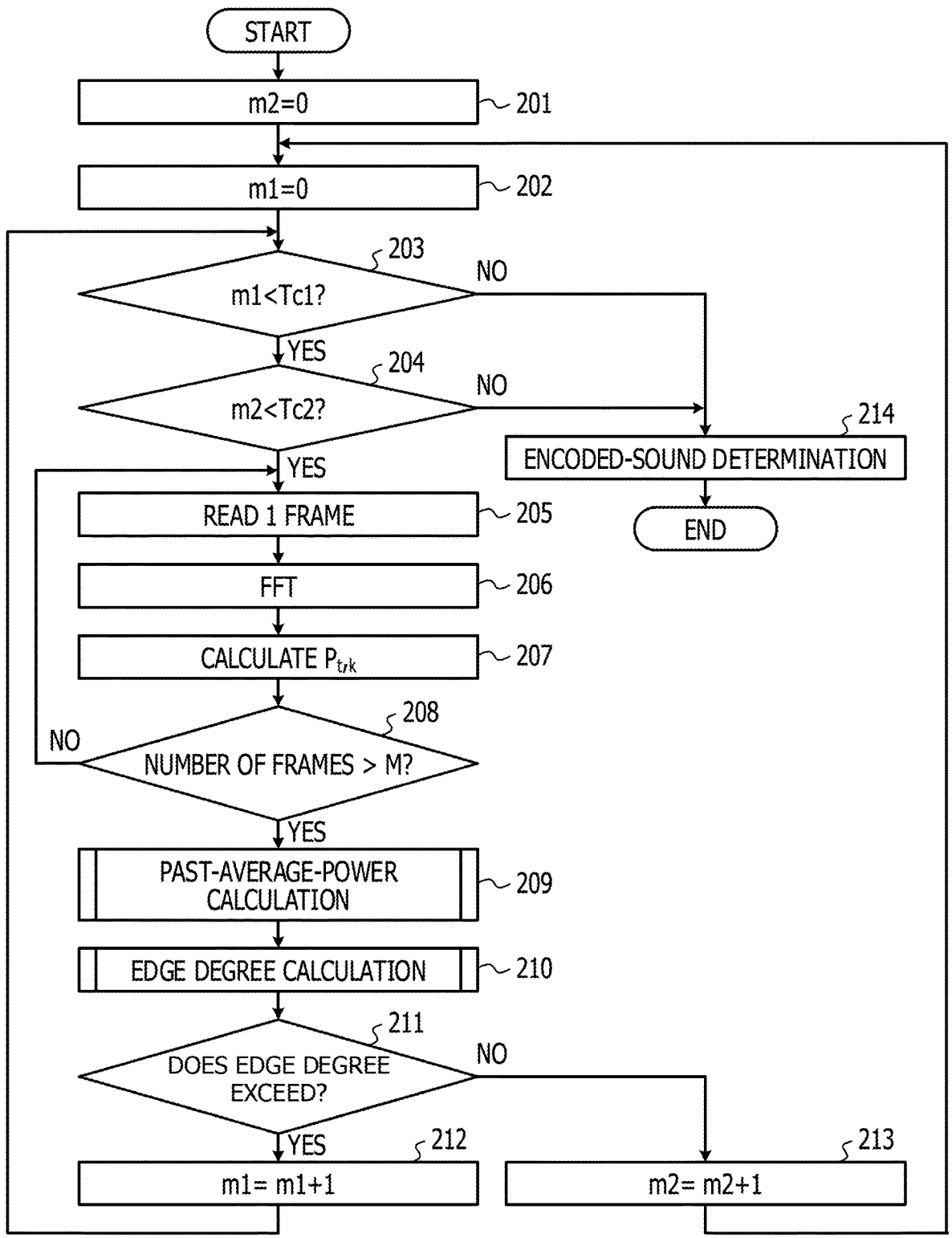
FIG. 17 is a flowchart illustrating a flow of encoded-sound determination processing in a third embodiment.

FIG. 17 is a flowchart illustrating a flow in the third embodiment. In step 201, the CPU 51 sets 0 for a variable m2 for counting the number of processes in which the edge degree does not exceed a threshold. In step 202, the CPU 51 sets 0 for a variable m1 for counting the number of processes in which the edge degree exceeds the threshold.

In step 203, the CPU 51 determines whether or not the value of the variable m1 is smaller than a predetermined value Tc1. When the result of the determination in step 203 is affirmative, that is, when the value of the variable m1 is smaller than the predetermined value Tc1, the CPU 51 advances to step 204 and determines whether or not the value of the variable m2 is smaller than a predetermined value Tc2.

When the result of the determination in step 204 is affirmative, that is, when the value of the variable m2 is smaller than the predetermined value Tc2, the CPU 51 advances to step 205. Since steps 205 to 210 are analogous to steps 101 to 106 in FIG. 7, descriptions thereof are not given hereinafter.

In step 211, the CPU 51 determines whether or not a difference between the average values of the powers in adjacent predetermined frequency-band units, that is, any of the edge degrees, exceeds a threshold. When the value of the variable m1 is larger than or equal to 1, a determination is made in step 211 as to whether or not an edge degree at a frequency band boundary that is the same as a frequency band boundary at which it is determined that the edge degree exceeds the threshold in the previous process exceeds the threshold. A case in which the value of the variable m1 is larger than or equal to 1 corresponds to a case in which it is determined in the previous encoded-sound determination process that any of edge degrees at the frequency band boundary exceeds the threshold.

When the result of the determination in step 211 is affirmative, the CPU 51 adds 1 to the value of the variable m1 in step 212 and returns to step 203. When the result of the determination step 211 is negative, the CPU 51 adds 1 to the value of the variable m2 in step 213 and returns to step 202.

When the result of the determination in step 203 is negative, or when the result of the determination in step 204 is negative, the CPU 51 performs an encoded-sound determination in step 214 and ends the encoded-sound determination processing. When the value of the variable m1 is larger than or equal to the predetermined value Tc1, or when the value of the variable m2 is larger than or equal to the predetermined value Tc2, the process proceeds to step 214. In step 214, when the value of the variable m1 is larger than or equal to the predetermined value Tc1, it is determined that the sound signals are signals of encoded sound, and when the value of the variable m2 is larger than or equal to the predetermined value Tc2, it is determined that the sound signals is not encoded sound, and the encoded-sound determination processing is ended.

The third embodiment may be applied to the first embodiment or may be applied to the second embodiment.

Figure 18:
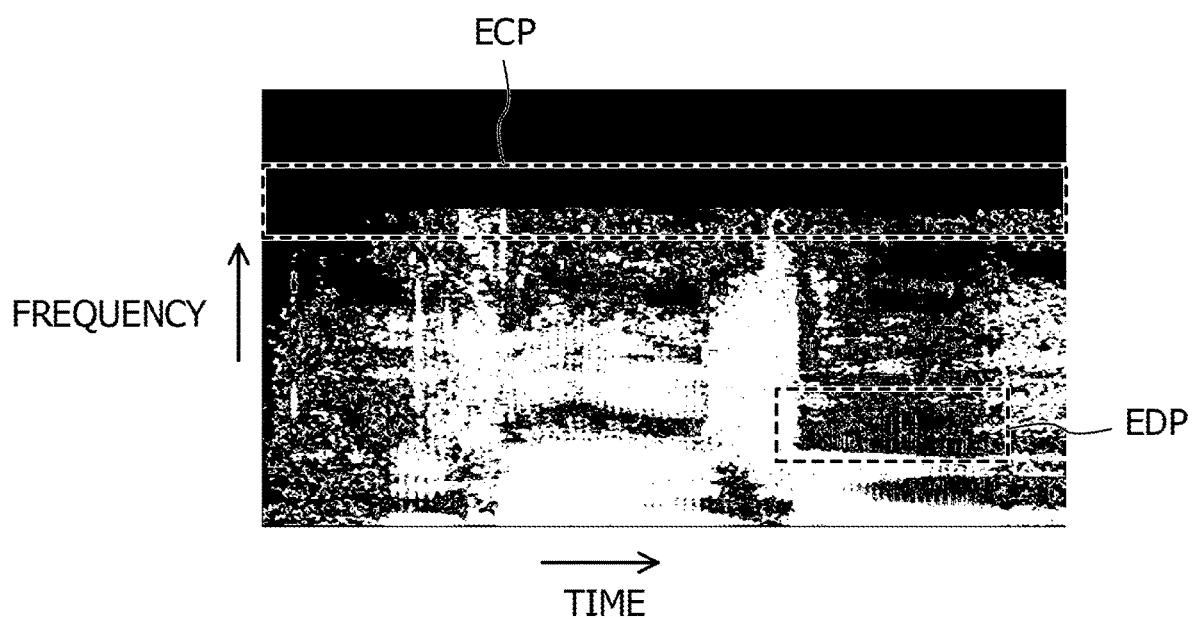
FIG. 18 illustrates power spectra in the vicinity of a boundary frequency of encoded sound and power spectra in the vicinity of a false boundary frequency.
Figure 19A:
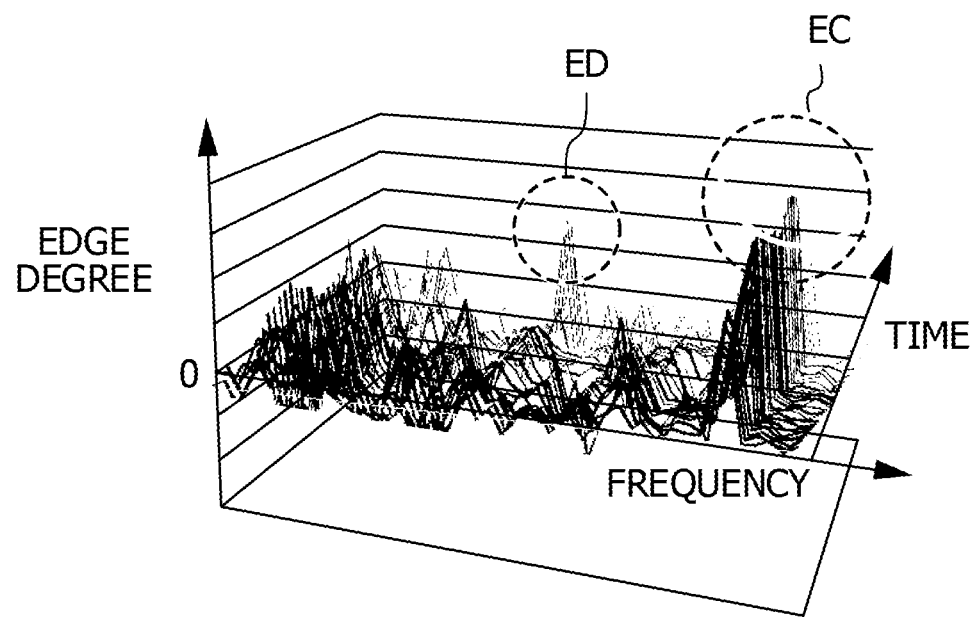
FIG. 19A illustrates an edge degree of adjacent predetermined frequency-band units of encoded sound.

FIG. 18 illustrates a power ECP of sound signals in the vicinity of a boundary frequency and a power EDP of sound signals in the vicinity of a false boundary frequency. FIG. 19A corresponds to power spectra in FIG. 18 and illustrates relationships of edge degrees, frequencies, and time. In FIG. 19A, the vertical axis represents an edge degree, the horizontal axis represents a frequency, and an axis that extends from a near side toward a farther side in the plane of the figure represents time.

An edge EC corresponding to the power ECP in the vicinity of the boundary frequency maintains a large edge degree that is generally similar in the time direction for a long period of time, and an edge ED corresponding to the power EDP in the vicinity of the false boundary frequency instantaneously exhibits a large edge degree in the time direction. For instance, the edge EC corresponding to the power ECP in the vicinity of the boundary frequency maintains a generally similar large edge degree, for example, for 0.5 s or more, and the edge ED corresponding to the power EDP in the vicinity of the false boundary frequency exhibits an edge degree, for example, for only 0.1 to 0.2 s.

Figure 19B:
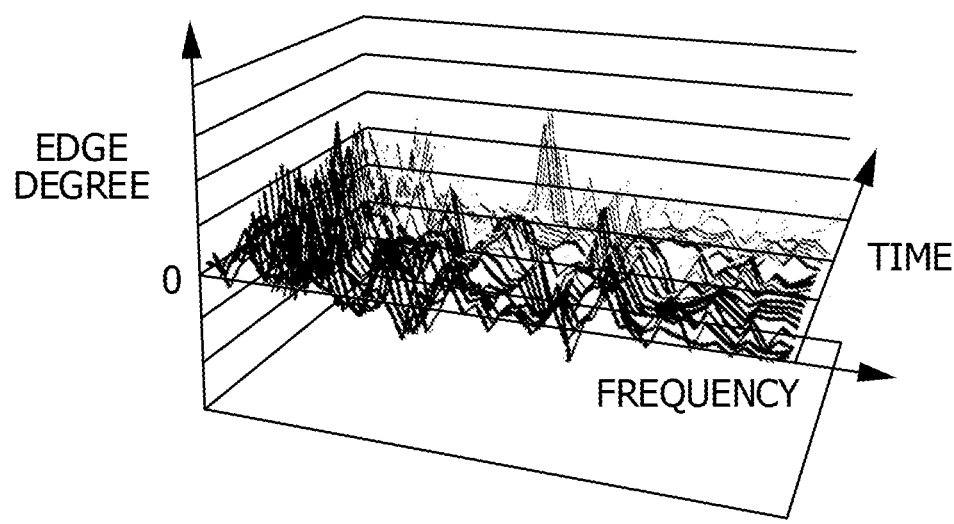
FIG. 19B illustrates an edge degree of adjacent predetermined frequency-band units of real voice.

FIG. 19B illustrates relationships of an edge degree of real voice, a frequency thereof, and time. In FIG. 19B, a large edge degree that is maintained at generally similar degrees for a long period of time does not exist, unlike the case in FIG. 19A. Meanwhile, an edge corresponding to the power of sound signals in the vicinity of the boundary frequency maintains a generally similar large edge degree in the time direction for a long period of time, as described above. Accordingly, in the third embodiment, when an edge degree that exceeds a threshold continues at the same frequency band boundary for a long period of time, it is determined that the sound signals in question are signals of encoded sound.

Thus, in the third embodiment, it is possible to reduce the possibility that a false boundary frequency is erroneously determined to be a boundary frequency, thus making it possible to improve the determination accuracy of encoded sound.

Fourth Embodiment

An example of a fourth embodiment will be described in detail with reference to the accompanying drawings. Elements and operations that are the same as or similar to those in the first to third embodiments are denoted by the same reference numerals, and descriptions thereof are not given hereinafter.

Figure 20:
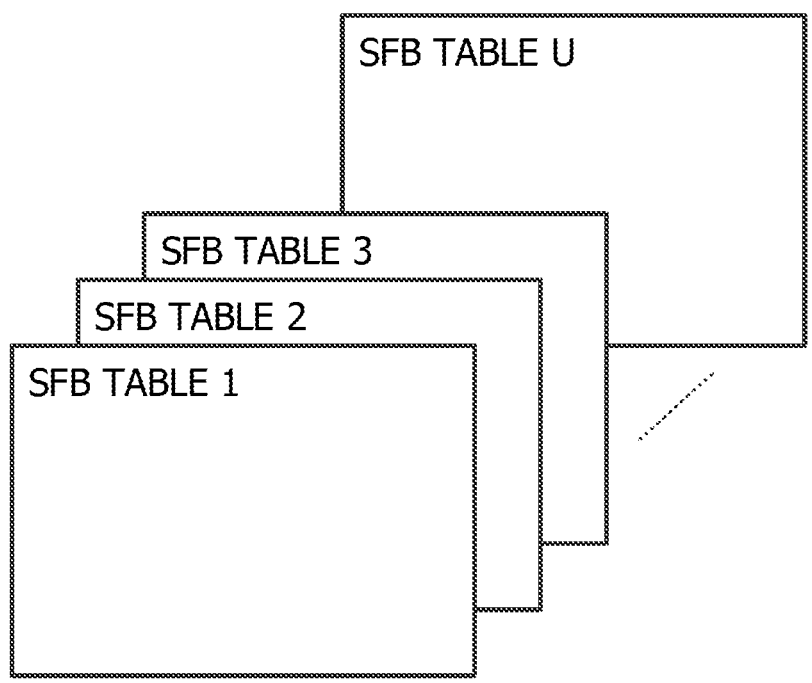
FIG. 20 illustrates a plurality of scale factor band tables.

The fourth embodiment corresponds to a case in which there is a plurality of types of sound-signal encoding and it is unclear that with which type of encoding sound signals are encoded. In the fourth embodiment, SFB tables 1 to U corresponding to possible types of encoding, as illustrated in FIG. 20, are prepared in the data storage region 53B in the secondary storage 53, and the SFB tables 1 to U are used to calculate edge degrees.

U is an integer greater than or equal to 2 and represents the total number of SFB tables that are used. SFB boundary positions defined by encoding types 1 to U and the numbers of SFBs are associated with each and stored in the SFB tables 1 to U, respectively.

In the fourth embodiment, the average values of the powers of the sound signals which are calculated using equation (1) are added for each of the SFBs for the SFB tables 1 to U, and the resulting average value is divided by the number of frequency samples included in the SFB, to thereby calculate the average value of the power for each SFB table and for each SFB, as represented in equation (7). An edge degree $EV_{b,l}$ that is a difference between the average values of the powers of sound signals in adjacent SFBs is calculated as in equation (8).

$$PV_{b,l} = \frac{1}{S_{b,l+1} - S_{b,l}} \sum_{j=S_{b,l}}^{S_{b,l+1}} \overline{P_j} \quad (7)$$

$$EV_{b,l} = \log_{10}\left(\frac{PV_{b,l}}{PV_{b,l+1}}\right) \quad (8)$$

where b is an integer of 1 to U and represents the number of the SFB table.

Figure 21:
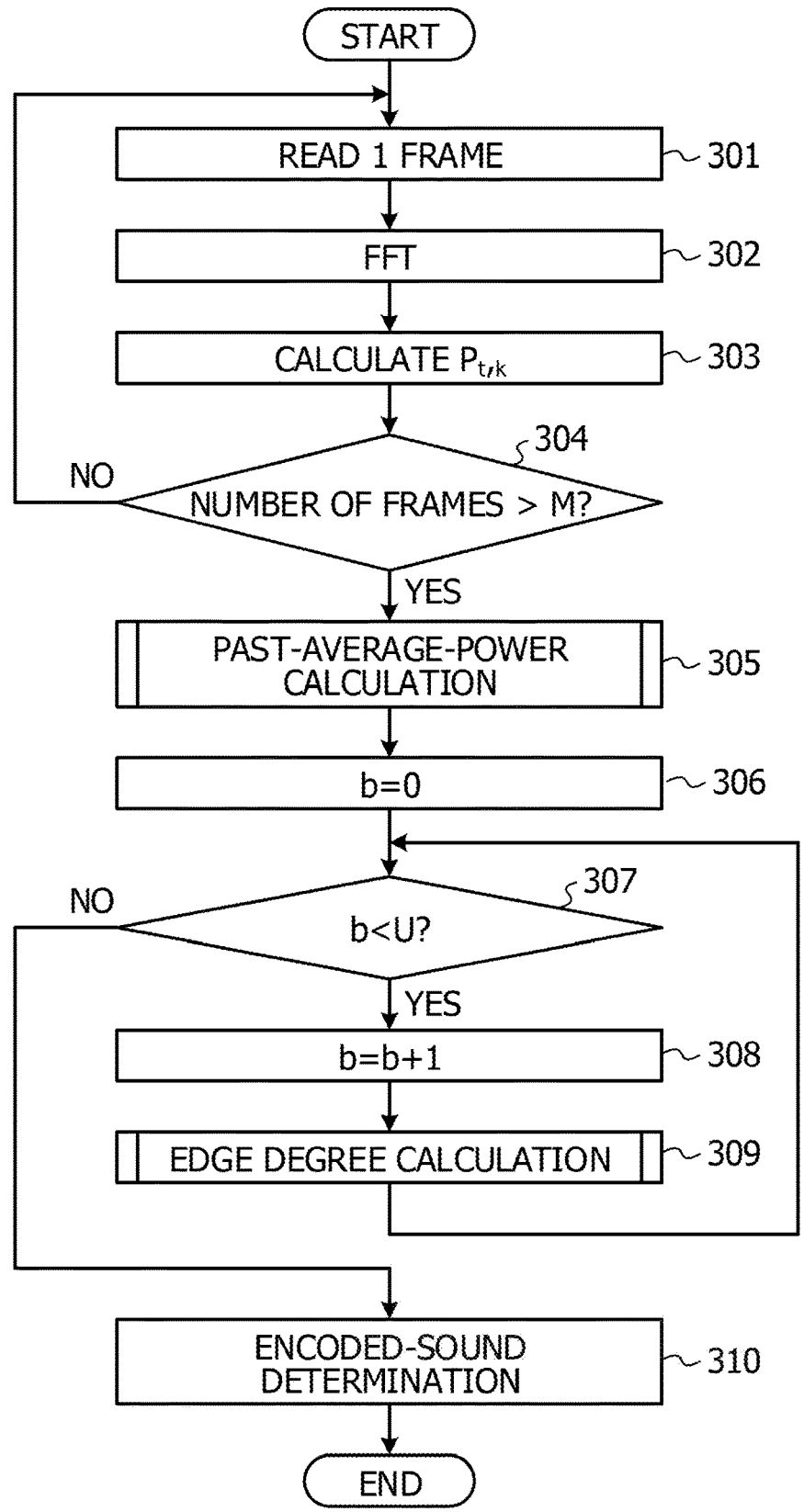
FIG. 21 is a flowchart illustrating a flow of encoded-sound determination processing in a fourth embodiment.

FIG. 21 is a flowchart illustrating a flow of processing in the fourth embodiment. Since steps 301 to 305 are analogous to steps 101 to 105 in FIG. 7, descriptions thereof are not given hereinafter. In step 306, the CPU 51 sets 0 for the variable b representing the number of the SFB table. In step 307, the CPU 51 determines whether or not the value of the variable b is smaller than the value of a value U representing the total number of SFB tables.

When the result of the determination in step 307 is affirmative, the CPU 51 adds 1 to the value of the variable b in step 308. In step 309, the CPU 51 calculates an edge degree of adjacent SFBs by using equations (7) and (8) noted above. Thereafter, the CPU 51 returns to step 307. When the result of the determination in step 307 is negative, that is, when the value of the variable b is larger than or equal to U, the CPU 51 advances to step 310. In steps 307 to 309, edge degrees in all adjacent SFBs in SFB tables 1 to U are calculated.

In step 310, when any of the edge degrees exceeds a predetermined value, the CPU 51 determines that the sound signals are signals of encoded sound. The encoded-sound determination processing in FIG. 21 may be repeated a predetermined number of times.

The second or third embodiment or a combination of the second and third embodiments may be applied to the fourth embodiment.

In the fourth embodiment, there is a plurality of types of encoding, and the predetermined frequency-band units are defined so as to correspond to the SFBs for the respective types of encoding.

Thus, in the fourth embodiment, even when sound signals are encoded with any of the plurality of types of encoding, the edge degree of an edge that exists at the boundary of adjacent SFBs is emphasized, and edges that exist in a band other than at the boundary of the SFBs are reduced. Accordingly, in the present embodiment, the possibility that a false boundary frequency is erroneously determined to be a boundary frequency is reduced, thus making it possible to further improve the determination accuracy of encoded sound.

Fifth Embodiment

An example of a fifth embodiment will be described below in detail with reference to the accompanying drawings. Elements and operations that are the same as or similar to those in the first to fourth embodiments are denoted by the same reference numerals, and descriptions thereof are not given hereinafter.

In the fifth embodiment, when the edge degree of the adjacent predetermined frequency-band units exceeds a processing threshold, the repetition of the encoded-sound determination is started, and when the state in which the edge degree of the adjacent predetermined frequency-band units is smaller than or equal to a processing threshold continues, the repetition of the encoded-sound determination is ended.

Figure 22:
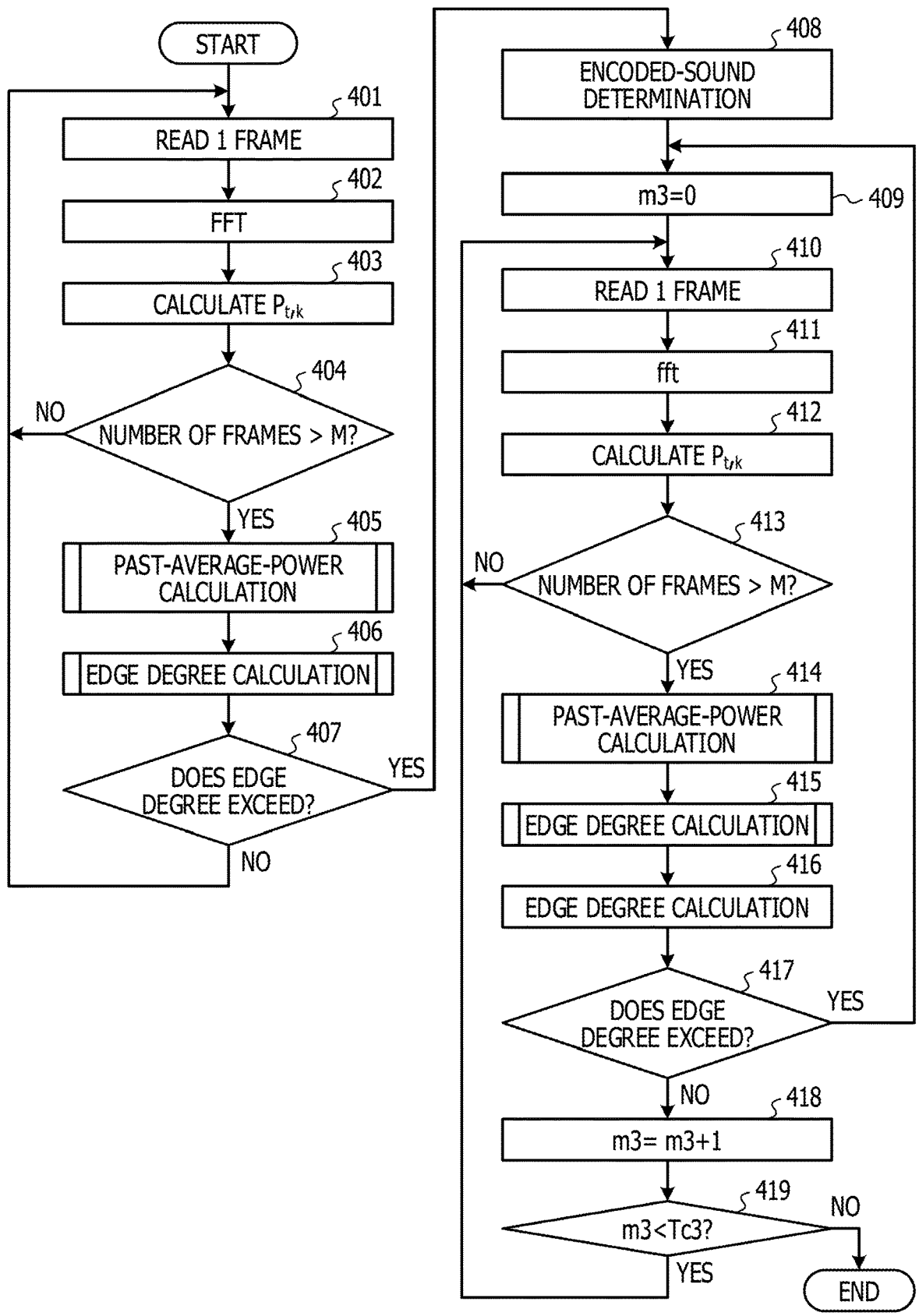
FIG. 22 is a flowchart illustrating a flow of encoded-sound determination processing in a fifth embodiment.

FIG. 22 is a flowchart illustrating a flow of processing in the fifth embodiment. Since steps 401 to 406 are analogous to steps 101 to 106 in FIG. 7, descriptions thereof are not given hereinafter. In step 407, the CPU 51 determines whether or not any of the edge degrees of adjacent frequency bands exceeds a processing threshold. This processing threshold is an example of a second predetermined value and may be the same as or different from the threshold used in the encoded-sound determination. When the result of the determination in step 407 is negative, that is, when all the edge degrees are smaller than or equal to the processing threshold, the CPU 51 returns to step 401.

When the result of the determination in step 407 is affirmative, that is, when any of the edge degrees exceeds the processing threshold, the CPU 51 performs an encoded-sound determination in step 408. Since step 408 is analogous to step 107 in FIG. 7, a description thereof is not given hereinafter. In step 409, the CPU 51 sets 0 for a variable m3 for counting the number of times the edge degree is smaller than or equal to the processing threshold.

Since steps 410 to 415 are analogous to steps 101 to 106 in FIG. 7, descriptions thereof are not given hereinafter. When the edge degree of the predetermined frequency-band units that are adjacent to each other at the same frequency band boundary as the frequency band boundary at which the edge degree exceeded the threshold in step 408 exceeds the threshold, it is determined in step 416 that the sound signals in question are signals of encoded sound.

In step 417, the CPU 51 determines whether or not the edge degree of the predetermined frequency-band units that are adjacent to each other at the same frequency band boundary as the frequency band boundary at which the edge degree exceeded the threshold in step 408 exceeds the processing threshold. When the result of the determination in step 417 is affirmative, that is, when the edge degree exceeds the processing threshold, the CPU 51 returns to step 409.

When the result of the determination in step 417 is negative, that is, when the edge degree is smaller than or equal to the processing threshold, the CPU 51 adds 1 to the variable m3 in step 418. In step 419, the CPU 51 determines whether or not the value of the variable m3 is smaller than a predetermined value Tc3. When the result of the determination in step 419 is affirmative, that is, when the value of the variable m3 is smaller than the predetermined value Tc3, the CPU 51 returns to step 410.

When the result of the determination in step 419 is negative, that is, when the value of the variable m3 is larger than or equal to the predetermined value Tc3, the CPU 51 ends the encoded-sound determination processing.

The process may proceed to step 408 when the number of times the edge degree of the predetermined frequency-band units that are adjacent to each other at the same frequency band boundary exceeds the processing threshold exceeds a predetermined number, instead of when any of the edge degrees exceeds the threshold in step 407.

In steps 417 to 419, when the number of times the edge degree is smaller than or equal to the processing threshold is larger than or equal to the predetermined value, the encoded-sound determination processing is ended. When the number of times the edge degree of the predetermined frequency-band units that are adjacent to each other at the same frequency band boundary exceeds the processing threshold is smaller than or equal to the predetermined number, the encoded-sound determination processing may be ended.

The fifth embodiment is applicable to one of the first to fourth embodiments, a combination of the first and third embodiments, a combination of the second and third embodiments, and a combination of the second to fourth embodiments.

In the fifth embodiment, when any of the edge degrees of the adjacent predetermined frequency-band units exceeds the processing threshold, the repetition of the encoded-sound determination is started, and when the number of times the edge degree is smaller than or equal to the processing threshold is larger than or equal to the predetermined value, the repetition of the encoded-sound determination is ended.

Thus, in the fifth embodiment, while an appliance, such as a television or a radio, that outputs encoded sound is operating, it is possible to repeat the encoded-sound determination.

Sixth Embodiment

An example of a sixth embodiment will be described below in detail with reference to the accompanying drawings. Elements and operations that are the same as or similar to those in the first to fifth embodiments are denoted by the same reference numerals, and descriptions thereof are not given hereinafter.

In the sixth embodiment, when a signal-to-noise ratio (SNR) exceeds a threshold, the encoded-sound determination is performed, and when the SNR is lower than or equal to the threshold, the encoded-sound determination is not performed.

Figure 23:
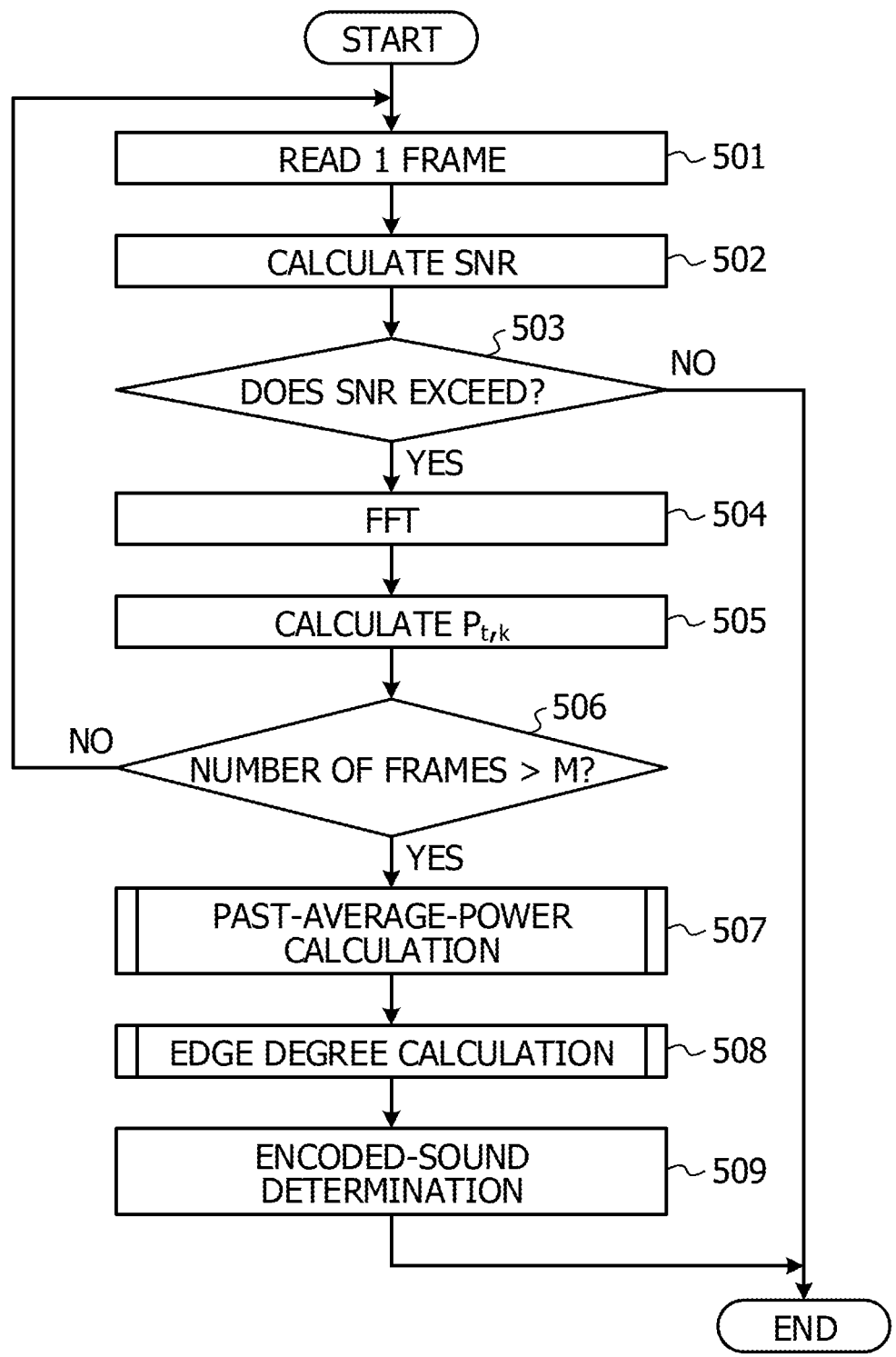
FIG. 23 is a flowchart illustrating a flow of encoded-sound determination processing in a sixth embodiment.

FIG. 23 is a flowchart illustrating a flow of processing in the sixth embodiment. Since step 501 is analogous to step 101 in FIG. 7, a description thereof is not given hereinafter. In step 502, the CPU 51 calculates an SNR that is a ratio of sound signals to background noise, by using a currently available method. In step 503, the CPU 51 determines whether or not the SNR exceeds a threshold, which is an example of a third predetermined value. When the result of the determination in step 503 is negative, that is, when the SNR is lower than or equal to the threshold, the CPU 51 ends the encoded-sound determination processing.

When the result of the determination in step 503 is affirmative, that is, when the SNR exceeds the threshold, the CPU 51 advances to step 504. Since steps 504 to 509 are analogous to steps 102 to 107 in FIG. 7, descriptions thereof are not given hereinafter. After executing steps 504 to 509, the CPU 51 ends the encoded-sound determination processing. The encoded-sound determination processing in FIG. 23 may be repeated a predetermined number of times.

The sixth embodiment is applicable to any of the first to the fifth embodiments, a combination of the first and third embodiments, and a combination of the first, third, and fifth embodiments. The sixth embodiment is applicable to a combination of the second and third embodiments, a combination of the second to fourth embodiments, and a combination of the second to fifth embodiments.

In the sixth embodiment, when the SNR of sound signals exceeds the threshold, the encoded-sound determination is performed, and when the SNR is lower than or equal to the threshold, the encoded-sound determination is not performed. This is because when the SNR is large, the background noise is small relative to the sound signals to make it easy to detect edges, and when the SNR is small, the background noise is large relative to the sound signals to make it difficult to detect edges. In the sixth embodiment, the encoded-sound determination is performed when it is easy to detect edges, to thereby reduce the possibility that edges are falsely detected, thus making it possible to improve the determination accuracy of encoded sound.

The flowcharts in FIGS. 7, 8, 9, 17, 21, 22, and 23 are examples, and the orders of processes are not limited to the orders of processes illustrated in the flowcharts.

In the first to sixth embodiments, the encoded-sound determination device 10 outputs a determination result indicating whether or not sound signals are signals of encoded sound, as illustrated in FIG. 1. The determination result is input to, for example, a voice-operated device, which is operated with voice. Examples of the voice-operated device include a smart speaker.

When the determination result indicates that the sound signals are signals of encoded sound, the voice-operated device outputs a voice notification for reducing the sound level of an encoded-sound output device, such as a television or a radio, to a sound output device, such as the speaker 29 illustrated in FIG. 6. The notification may be issued via an image output device, such as a display, by using characters or an image. In this case, the voice-operated device does not perform processing, such as voice recognition, associated with voice operation.

A device that receives the determination result from the encoded-sound determination device 10 is not limited to the voice-operated device and may be, for example, a voice authentication device that performs user authentication based on voice. When the determination result indicates that the sound signals are signals of encoded sound, the voice authentication device issues a notification indicating that the sound used in the authentication is inappropriate via a sound output device, a character output device, or an image output device by using sound, characters, or an image. In this case, the voice authentication device does not perform processing, such as speech-segment detection, associated with voice authentication.

When the device that receives the determination result from the encoded-sound determination device 10 is, for example, a safety checking system that performs safety checking of a solitary person, and the determination result indicates that sound signals are signals of encoded sound, it is determined that a device, such as a television or a radio, that outputs encoded sound is operating. The safety checking system determines whether or not there is something wrong with a user, based on the determination result, and issues a notification indicating the state of the user to, for example, an administrator of the system via a sound output device, a character output device, or an image output device by using of sound, characters, or an image.

The determination result of the encoded-sound determination device 10 may be accumulated in the data storage region 53B in the secondary storage 53, for example, in association with time. The determination result of the encoded-sound determination device 10 may be accumulated in an external storage device, connected via the external interface 54, for example, in association with time.

[Related Technology]

In order to avoid authentication based on recorded voice, there is a related technology that determines that sound in question is recorded voice, based on an increase in the sound pressure of sound signals in a silence segment owing to superimposition of dark noise.

Figure 24:
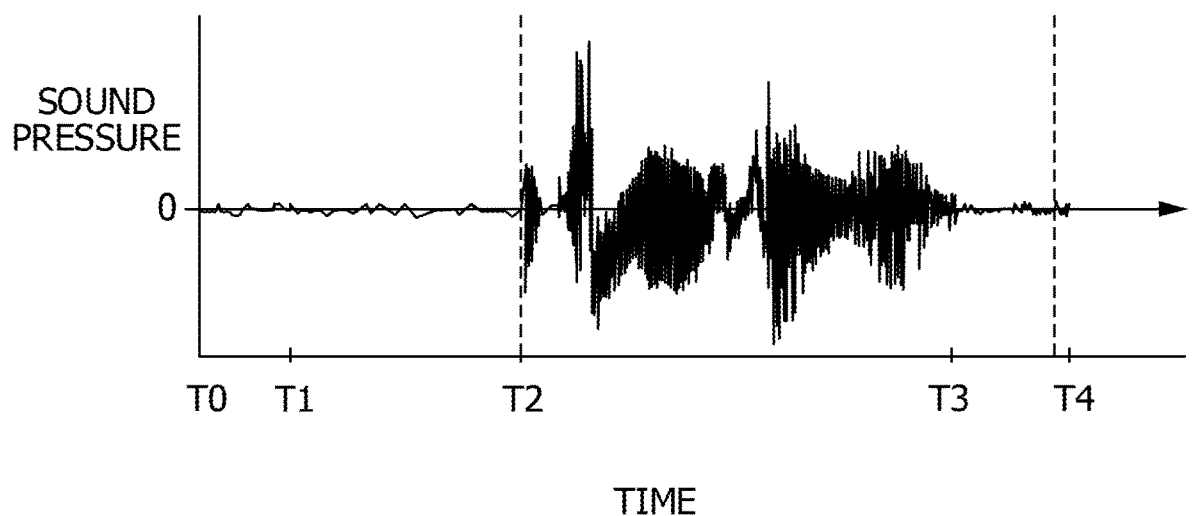
FIG. 24 illustrates variations in a sound pressure in order to describe a related technology for determining recorded voice.
Figure 25:
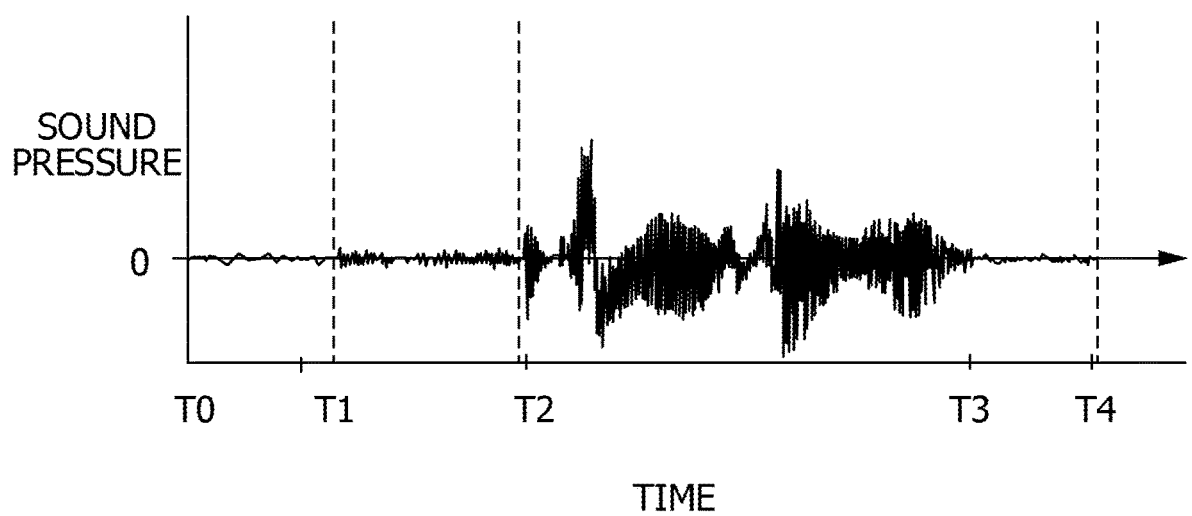
FIG. 25 illustrates variations in a sound pressure in order to describe the related technology for determining recorded voice.

In real voice, the sound pressure of sound signals in silence segments T0 to T2 does not increase, as illustrated in FIG. 24. When playback of recorded voice is started in silence segments T0 to T2, as illustrated in FIG. 25, dark noise in the recorded voice is superimposed to thereby increase the sound pressure of the recorded voice in playback start time T1 to non-silence segment start time T2. The non-silence segment start time T2 may be referred to as a start time T2 of a voice segment including T2, T3 and T4. In the related technology, whether or not sound in question is real voice is determined based on an increase in the sound pressure in the silence segment.

Figure 26:
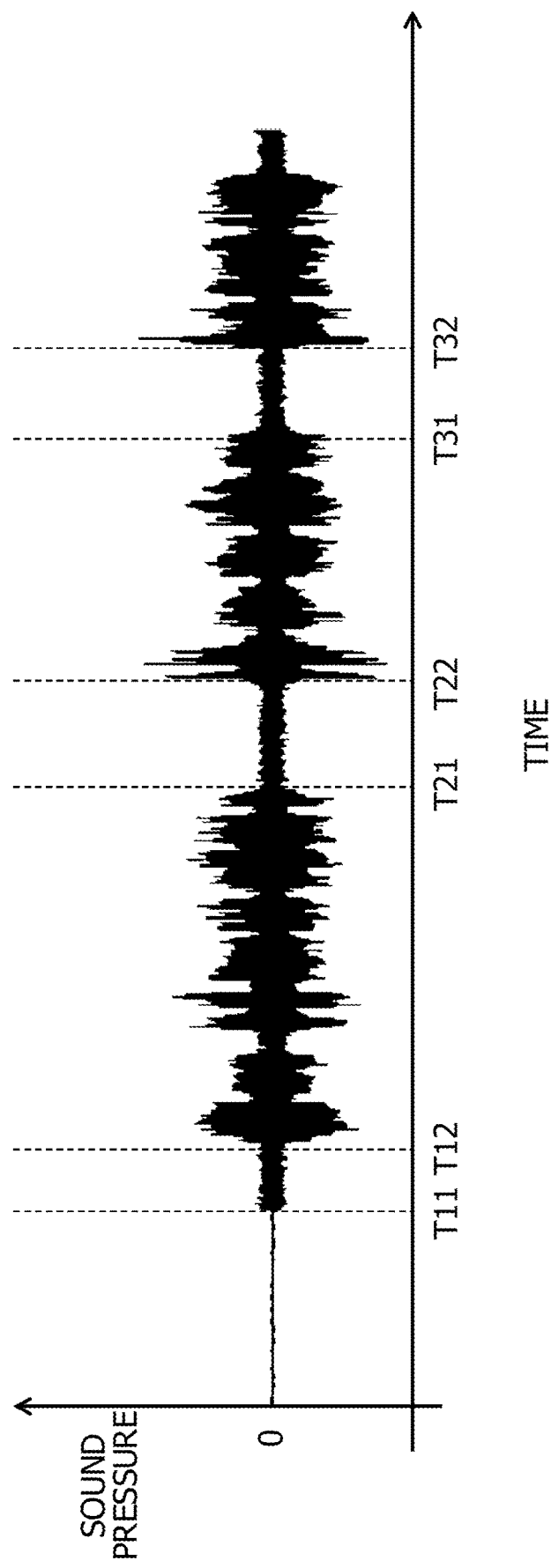
FIG. 26 illustrates variations in a sound pressure in order to describe the related technology for determining recorded voice.

However, as illustrated in FIG. 26, in broadcast sound that is continuously played, since dark noise is superimposed thereon from the beginning, an increase in the sound pressure is not detected in silence segments T11 to T12 and T21 to T22 and T31 to T32, which start after T11 and in which playback of the broadcast sound is continued. Accordingly, for broadcast sound that is continuously played, it is difficult to determine whether or not sound in question is real voice, by using the related technology.

In the present embodiment, edge degrees in adjacent predetermined frequency-band units are used to determine whether or not sound signals in question are signals of encoded sound. Since the edge degrees are features that are generally steady in the time direction, for example, as illustrated in FIG. 4, it is possible to determine whether or not broadcast sound that is continuously played is real voice, that is, whether or not broadcast sound that is continuously played is encoded sound.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A method for encoded-sound determination performed by a computer, the method comprising:
    executing a first process that includes
        obtaining a first average intensity corresponding to a first frequency band of a sound signal, and
        obtaining a second average intensity corresponding to a second frequency band of the sound signal, the second frequency band being adjacent to the first frequency band via a boundary frequency and being higher than the first frequency band; and executing a second process that includes
obtaining a ratio between the first average intensity and the second average intensity, and
determining, by using the obtained ratio, whether the sound signal represents encoded sound, to output a signal corresponding to a determination result to an other device as a notification outputted visually or audibly from the other device or as a notification causing the other device to perform processing corresponding to the determination result, wherein the second process is configured to cause processor circuitry of the computer to repeat the determination as to whether or not the sound signals are signals of encoded sound after a value indicating a difference between the intensities of the sound signals in adjacent predetermined frequency bands exceeds a second predetermined value until a value indicating the intensities in the predetermined frequency bands that are adjacent to each other at a same frequency band boundary as a frequency band boundary at which the value indicating the difference exceeds the second predetermined value becomes smaller than or equal to the second predetermined value a predetermined number of times or more.

2. The method according to claim 1,
wherein the first process is configured to calculate a value indicating a difference between the intensities of the sound signals by performing a first computational operation including: adding, for a predetermined number of frames, powers of the sound signals in each predetermined frequency band, calculating a time-direction average value obtained by dividing a power resulting from the addition by the predetermined number, adding the time-direction average values for respective frequency units included in the predetermined frequency band, and dividing a value resulting from the addition by the number of frequency units included in the predetermined frequency band.

3. The method according to claim 1,
wherein the predetermined frequency bands are defined so as to correspond to respective scale factor bands defined by a type of encoding of sound signals.

4. The method according to claim 3,
wherein the type of encoding comprises a plurality of types of encoding, and
wherein the predetermined frequency bands are defined so as to correspond to the respective scale factor bands for each of the types of encoding.

5. The method according to claim 1,
wherein the second process is configured to determine that the sound signals are signals of encoded sound when a value indicating a difference between the intensities of the sound signals in predetermined frequency bands that are adjacent to each other at a same frequency band boundary exceeds a first predetermined value for a predetermined amount of time or more.

6. The method according to claim 1,
wherein the second process is configured to determine whether or not the sound signals are signals of encoded sound when a signal-to-noise ratio of the sound signals exceeds a third predetermined value.

7. A non-transitory computer-readable storage medium for storing a program which causes a processor to perform processing for encoded- sound determination, the processing comprising:

executing a first process that includes
obtaining a first average intensity corresponding to a first frequency band of a sound signal, and
obtaining a second average intensity corresponding to a second frequency band of the sound signal, the second frequency band being adjacent to the first frequency band via a boundary frequency and being higher than the first frequency band; and executing a second process that includes
obtaining a ratio between the first average intensity and the second average intensity, and
determining, by using the obtained ratio, whether the sound signal represents encoded sound, to output a signal corresponding to a determination result to an other device as a notification outputted visually or audibly from the other device or as a notification causing the other device to perform processing corresponding to the determination result, wherein the second process is configured to cause the processor to repeat the determination as to whether or not the sound signals are signals of encoded sound after a value indicating a difference between the intensities of the sound signals in adjacent predetermined frequency bands exceeds a second predetermined value until a value indicating the intensities in the predetermined frequency bands that are adjacent to each other at a same frequency band boundary as a frequency band boundary at which the value indicating the difference exceeds the second predetermined value becomes smaller than or equal to the second predetermined value a predetermined number of times or more.

8. The non-transitory computer-readable storage medium according to claim 7,
wherein the first process is configured to calculate a value indicating a difference between the intensities of the sound signals by performing a first computational operation including: adding, for a predetermined number of frames, powers of the sound signals in each predetermined frequency band, calculating a time-direction average value obtained by dividing a power resulting from the addition by the predetermined number, adding the time-direction average values for respective frequency units included in the predetermined frequency band, and dividing a value resulting from the addition by the number of frequency units included in the predetermined frequency band.

9. The non-transitory computer-readable storage medium according to claim 7,
wherein the predetermined frequency bands are defined so as to correspond to respective scale factor bands defined by a type of encoding of sound signals.

10. The non-transitory computer-readable storage medium according to claim 9,
wherein the type of encoding comprises a plurality of types of encoding, and
wherein the predetermined frequency bands are defined so as to correspond to the respective scale factor bands for each of the types of encoding.

11. The non-transitory computer-readable storage medium according to claim 7,
wherein the second process is configured to determine that the sound signals are signals of encoded sound when a value indicating a difference between the intensities of the sound signals in predetermined frequency bands that are adjacent to each other at a same frequency band boundary exceeds a first predetermined value for a predetermined amount of time or more.

12. The non-transitory computer-readable storage medium according to claim 7,
wherein the second process is configured to determine whether or not the sound signals are signals of encoded sound when a signal-to-noise ratio of the sound signals exceeds a third predetermined value.

13. An apparatus for encoded-sound determination, the apparatus comprising:
a memory; and
a processor coupled to the memory; the processor being configured to execute a first process that includes
obtaining a first average intensity corresponding to a first frequency band of a sound signal, and
obtaining a second average intensity corresponding to a second frequency band of the sound signal, the second frequency band being adjacent to the first frequency band via a boundary frequency and being higher than the first frequency band; and
execute a second process that includes
obtaining a ratio between the first average intensity and the second average intensity, and
determining, by using the obtained ratio, whether the sound signal represents encoded sound, to output a signal corresponding to a determination result to an other device as a notification outputted visually or audibly from the other device or as a notification causing the other device to perform processing corresponding to the determination result,
wherein the second process is configured to cause the processor to repeat the determination as to whether or not the sound signals are signals of encoded sound after a value indicating a difference between the intensities of the sound signals in adjacent predetermined frequency bands exceeds a second predetermined value until a value indicating the intensities in the predetermined frequency bands that are adjacent to each other at a same frequency band boundary as a frequency band boundary at which the value indicating the difference exceeds the second predetermined value becomes smaller than or equal to the second predetermined value a predetermined number of times or more.

14. The apparatus according to claim 13,
wherein the first process is configured to calculate a value indicating a difference between the intensities of the sound signals by performing a first computational operation including: adding, for a predetermined number of frames, powers of the sound signals in each predetermined frequency band, calculating a time-direction average value obtained by dividing a power resulting from the addition by the predetermined number, adding the time-direction average values for respective frequency units included in the predetermined frequency band, and dividing a value resulting from the addition by the number of frequency units included in the predetermined frequency band.

15. The apparatus according to claim 13,
wherein the predetermined frequency bands are defined so as to correspond to respective scale factor bands defined by a type of encoding of sound signals.

16. The apparatus according to claim 15,
wherein the type of encoding comprises a plurality of types of encoding, and
wherein the predetermined frequency bands are defined so as to correspond to the respective scale factor bands for each of the types of encoding.

17. The apparatus according to claim 13,
wherein the second process is configured to determine that the sound signals are signals of encoded sound when a value indicating a difference between the intensities of the sound signals in predetermined frequency bands that are adjacent to each other at a same frequency band boundary exceeds a first predetermined value for a predetermined amount of time or more.

* * * * *